United States Patent
Chou et al.

(10) Patent No.: US 12,281,036 B2
(45) Date of Patent: Apr. 22, 2025

(54) METHODS FOR FORMING GLASS CERAMIC ARTICLES

(71) Applicant: CORNING INCORPORATED, Corning, NY (US)

(72) Inventors: I-Wen Chou, Taoyuan (TW); Carol Ann Click, Corning, NY (US); Shuo Cui, Burlington, MA (US); James Howard Edmonston, Corning, NY (US); Mathieu Gerard Jacques Hubert, Corning, NY (US); Katherine Weber Kroemer, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 440 days.

(21) Appl. No.: 16/924,777

(22) Filed: Jul. 9, 2020

(65) Prior Publication Data

US 2021/0009459 A1    Jan. 14, 2021

Related U.S. Application Data

(60) Provisional application No. 62/873,819, filed on Jul. 12, 2019.

(51) Int. Cl.
    *C03B 32/02*    (2006.01)
(52) U.S. Cl.
    CPC .................................. *C03B 32/02* (2013.01)
(58) Field of Classification Search
    CPC ............................. C03B 35/202; C03B 32/02
    See application file for complete search history.

(56) References Cited

U.S. PATENT DOCUMENTS

| | | | |
|---|---|---|---|
| 3,804,608 A | | 4/1974 | Gaskell et al. |
| 3,931,438 A | * | 1/1976 | Beall ........................ C03C 10/00 428/218 |
| 5,788,731 A | * | 8/1998 | Suzuki ................ C03B 23/0307 65/102 |
| 5,798,469 A | * | 8/1998 | Nufer ..................... H01L 23/367 419/36 |
| 6,180,188 B1 | * | 1/2001 | Belleville ........... C03C 17/3417 427/407.1 |
| 6,387,517 B1 | * | 5/2002 | Belleville .............. C01G 35/00 106/287.18 |
| 9,382,603 B2 | * | 7/2016 | Kimura ................... C22C 21/00 |

(Continued)

FOREIGN PATENT DOCUMENTS

| CN | 109437535 B | * | 3/2019 | ............. C03B 32/02 |
|---|---|---|---|---|
| CN | 110828168 A | * | 2/2020 | ............. C03B 25/00 |

(Continued)

OTHER PUBLICATIONS

Machine translation JP-2000-072489 (Year: 2000).*

(Continued)

*Primary Examiner* — Jodi C Franklin

(57) ABSTRACT

A method for forming glass ceramic articles includes heating a stack of glass sheets to a nucleation temperature to create a nucleated crystallizable stack of sheets; heating the nucleated crystallizable stack of glass sheets to a crystallization temperature; and maintaining the crystallization temperature for a predetermined period of time to produce the glass-ceramic articles. The stack of glass sheets has a mass index of less than or equal to 35.

16 Claims, 30 Drawing Sheets

(56) References Cited

U.S. PATENT DOCUMENTS

| | | | |
|---|---|---|---|
| 9,556,062 B2* | 1/2017 | Ogawa | C03B 32/02 |
| 9,701,573 B2 | 7/2017 | Beall et al. | |
| 11,011,796 B2* | 5/2021 | Chen | H01M 50/491 |
| 11,014,848 B2* | 5/2021 | Click | C03C 21/002 |
| 11,183,639 B2* | 11/2021 | Morii | H01L 51/004 |
| 11,274,058 B2* | 3/2022 | Li | C03C 21/002 |
| 2002/0183187 A1* | 12/2002 | Siebers | C03B 32/02 |
| | | | 501/4 |
| 2004/0149368 A1* | 8/2004 | Wang | C03C 14/004 |
| | | | 156/89.12 |
| 2005/0016214 A1* | 1/2005 | Hsu | C03B 32/02 |
| | | | 65/29.21 |
| 2005/0183456 A1 | 8/2005 | Taplan et al. | |
| 2010/0116413 A1* | 5/2010 | Tanaka | H05K 3/4629 |
| | | | 156/89.12 |
| 2011/0071011 A1* | 3/2011 | Fujisawa | C03C 3/085 |
| | | | 501/68 |
| 2011/0262694 A1* | 10/2011 | Janssen | C03C 17/3435 |
| | | | 427/160 |
| 2011/0266088 A1* | 11/2011 | Koike | B32B 7/12 |
| | | | 181/290 |
| 2013/0225388 A1* | 8/2013 | Nakane | C03C 3/095 |
| | | | 501/67 |
| 2014/0141960 A1* | 5/2014 | Borczuch-Laczka | |
| | | | C03C 23/0005 |
| | | | 501/63 |
| 2014/0345328 A1* | 11/2014 | Folgar | C03C 10/0027 |
| | | | 65/33.2 |
| 2015/0274602 A1* | 10/2015 | Ishii | B01J 35/04 |
| | | | 156/89.22 |
| 2016/0102010 A1* | 4/2016 | Beall | C03C 4/02 |
| | | | 501/4 |
| 2016/0146993 A1* | 5/2016 | Kumagai | G02B 5/281 |
| | | | 359/359 |
| 2018/0182549 A1* | 6/2018 | Koide | C04B 35/638 |
| 2018/0329123 A1* | 11/2018 | Saito | B32B 7/022 |
| 2020/0017339 A1 | 1/2020 | Hall et al. | |
| 2020/0017393 A1* | 1/2020 | Hall | C03B 27/0413 |
| 2020/0017395 A1* | 1/2020 | Click | C03B 32/02 |
| 2020/0017398 A1* | 1/2020 | Click | C03C 10/0009 |
| 2020/0017399 A1 | 1/2020 | Click et al. | |
| 2021/0009459 A1* | 1/2021 | Chou | C03C 10/0027 |
| 2021/0130228 A1* | 5/2021 | Cui | C03C 17/25 |
| 2021/0292220 A1* | 9/2021 | Cui | C03B 32/02 |
| 2021/0380462 A1* | 12/2021 | Hall | C03B 32/02 |

FOREIGN PATENT DOCUMENTS

| | | | |
|---|---|---|---|
| CN | 113195424 A | 7/2021 | |
| DE | 102010006232 A1 | 2/2011 | |
| DE | 102016107630 A1 * | 10/2017 | |
| JP | 11-278859 A | 10/1999 | |
| JP | 2000-072489 A | 3/2000 | |
| JP | 2002-087835 A | 3/2002 | |
| JP | 2002-160931 A | 6/2002 | |
| JP | 2009-167062 A | 7/2009 | |
| JP | 2015-069669 A | 4/2015 | |
| WO | WO-2014190697 A1 * | 12/2014 | C03B 32/02 |
| WO | 2020/018393 A1 | 1/2020 | |

OTHER PUBLICATIONS

Machine translation JP-2014012617 (Year: 2014).*
Translation (Year: 2021).*
International Search Report and Written Opinion of the International Searching Authority; PCT/US2020/041475; Mailed Oct. 21, 2020; 9 Paes; European Patent Office.
Chinese Patent Application No. 202080064071.1, Office Action dated May 16, 2023, 5 pages (English Translation only), Chinese Patent Office.

* cited by examiner

METHODS FOR FORMING GLASS CERAMIC ARTICLES

This application claims the benefit of priority under 35 U.S.C. § 119 of U.S. Provisional Application Ser. No. 62/873,819 filed on Jul. 12, 2019 the content of which is relied upon and incorporated herein by reference in its entirety.

BACKGROUND

Field

The present specification generally relates to methods for forming glass ceramic articles, and particularly relates to methods for forming glass ceramic articles having improved properties, such as low warp and low stress.

Technical Background

There is a demand for high strength glass for portable electronic devices. Several materials are currently being utilized on the market such as glass, zirconia, plastic, metal, and glass ceramics.

Glass ceramics have certain advantages over other materials, but it can be difficult to form a glass ceramic having the properties required for a high strength portable device. Accordingly, a need exists for glass ceramic articles have improved properties and methods for making the glass ceramic articles.

SUMMARY

A first aspect includes a method for forming glass ceramic articles comprising: heating a stack of glass sheets to a nucleation temperature to create a nucleated crystallizable stack of sheets; heating the nucleated crystallizable stack of glass sheets to a crystallization temperature; and maintaining the crystallization temperature for a predetermined period of time to produce the glass-ceramic articles, wherein the stack of glass sheets has a mass index of less than or equal to 35.

A second aspect includes the method of the first aspect, wherein the stack of glass sheets has a mass index of less than or equal to 25.

A third aspect includes the method of any one of the first or second aspects, wherein the stack of glass sheets has a mass index of less than or equal to 15.

A fourth aspect includes the method of any one of the first to third aspects, wherein the stack of glass sheets has a mass index of less than or equal to 10.

A fifth aspect includes the method of any one of the first to fourth aspects, wherein the glass sheets have a thickness less than or equal to 1.11 mm and the number of glass sheets in the stack of glass sheets is less than 31.

A sixth aspect includes the method of any one of the first to fifth aspects, wherein the glass sheets have a thickness less than or equal to 1.11 mm and the number of glass sheets in the stack of glass sheets is less than 22.

A seventh aspect includes the method of any one of the first to sixth aspects, wherein the glass sheets have a thickness less than or equal to 1.11 mm and the number of glass sheets in the stack of glass sheets is less than 9.

An eighth aspect includes the method of any one of the first to seventh aspects, wherein the stack of glass sheets is present on a carrier plate.

A ninth aspect includes the method of any one of the first to eighth aspects, wherein a setter plate is positioned on at least one surface of the stack of glass sheets.

A tenth aspect includes the method of any one of the first to ninth aspects, wherein the method comprises: heating a plurality of stacks of glass sheets to a nucleation temperature to create a nucleated crystallizable plurality of stacks of glass sheets; heating the nucleated crystallizable plurality of stacks of glass sheets to a crystallization temperature; and maintaining the crystallization temperature for a predetermined period of time to produce the glass-ceramic articles, wherein each one of the plurality of stacks of glass sheets has a mass index of less than or equal to 35.

An eleventh aspect includes the method of any one of the first to tenth aspects, wherein each one of the plurality of stacks of glass sheets has a mass index of less than or equal to 25.

A twelfth aspect includes the method of any one of the first to eleventh aspects, wherein each one of the plurality of stacks of glass sheets has a mass index of less than or equal to 10.

A thirteenth aspect includes the method of any one of the first to twelfth aspects, wherein a first stack of glass sheets is positioned on a carrier plate, a setter is placed on the first stack of glass sheets such that a first surface of the setter is in contact with the first stack of glass sheets, and a second stack of glass sheets is placed on a second surface of the setter, wherein the second surface of the setter is opposite of the first surface of the setter.

A fourteenth aspect includes the method of any one of the first to thirteenth aspects, wherein the nucleation temperature is from 500° C. to 650° C., and the crystallization temperature is from 680° C. to 800° C.

DETAILED DESCRIPTION

Figure 1:
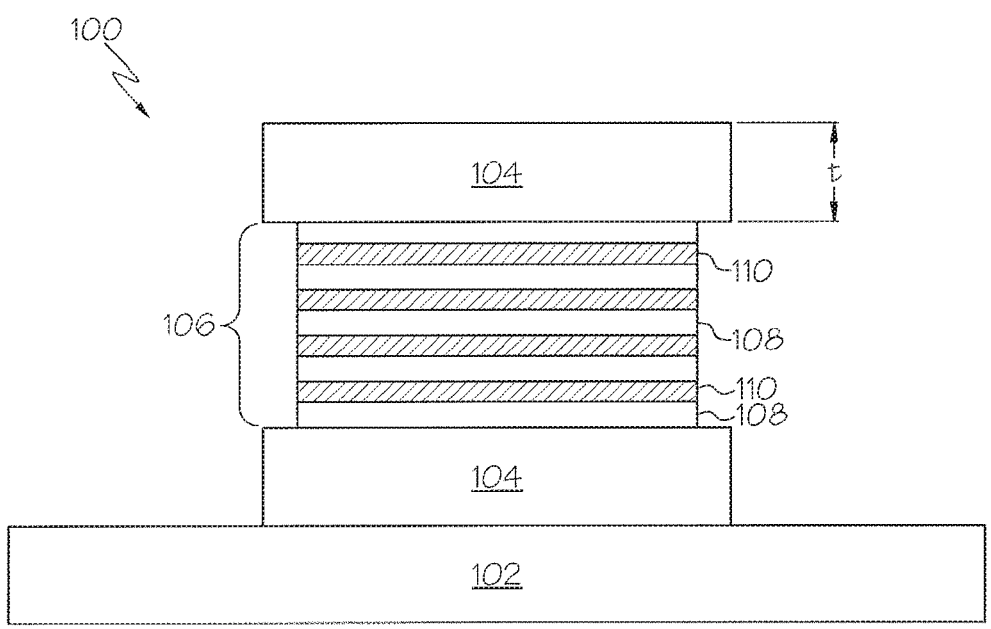
FIG. 1 schematically depicts a glass stack according to embodiments disclosed and described herein.

Reference will now be made in detail to embodiments of methods for ceramming glass articles; embodiments of which are illustrated in the accompanying drawings. Various embodiments will be described herein with specific reference to the appended drawings.

Definitions and Measurement Techniques

As used herein, the term "glass-ceramic" are solids prepared by controlled crystallization of a precursor glass and have one or more crystalline phases and a residual glass phase.

The crystalline phase assemblage (before ion exchange) and weight percentage of the crystalline phases and residual glass phase is determined based on x-ray diffraction (XRD) using a Rietveld analysis.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Directional terms as used herein—for example up, down, right, left, front, back, top, bottom, vertical, horizontal—are made only with reference to the figures as drawn and are not intended to imply absolute orientation unless otherwise expressly stated.

As used herein, the terms "warp" and "flatness"—and any variations thereof—are used interchangeably and have the same meaning.

Any ranges used herein include all ranges and subranges and any values there between unless explicitly stated otherwise.

General Overview of Glass-Ceramic Articles

Reference will now be made in detail to the present preferred embodiment(s), examples of which is/are illustrated in the accompanying drawings. Whenever possible, the same reference numerals will be used throughout the drawings to refer to the same or like parts.

Glass-ceramic articles have attributes that can be tailored for use as cover substrates and/or housings for mobile electronic devices. For example, without being bound by theory, glass-ceramic articles with high fracture toughness and/or Young's modulus can provide resistance to crack penetration and drop performance. When such glass-ceramic articles are chemically strengthened, for example through ion exchange, the resistance to crack penetration and drop performance can be further enhanced. And the high fracture toughness and/or Young's modulus can also increase the amount of stored tensile energy and maximum central tension that can be imparted to the glass-ceramic article through chemical tempering while maintaining desirable fragmentation of the glass-ceramic article upon fracture. As another example, the optical characteristics of the glass-ceramic articles, such as transparency and haze, can be tailored through adjusting the heating/ceramming schedule used to turn a glass article into a glass-ceramic article as well as through chemical strengthening, such as through ion exchange, to design or control the properties of the glass-ceramic article.

Stack Configurations For Forming Glass Ceramic Articles

In general, a process for forming a glass-ceramic includes forming a glass article and ceramming the glass article to transform the glass article into a glass-ceramic form. Referring to FIG. 1, an example stack configuration 100 for ceramming is illustrated. The stack configuration 100 includes a carrier plate 102 supporting two setter plates 104, and a glass stack 106 positioned between the setter plates 104.

In some embodiments, insulation layers (not shown) may be located on the top surface of the upper setter plate 104 and one the bottom surface of the lower setter plate 104. The insulation layers may be formed from any material having a low thermal conductivity and can reduce or even eliminate axial temperature gradients of the glass sheets 108 on the top and bottom of the glass stack 106.

As shown in FIG. 1, the glass stack 106 includes a plurality of glass sheets 108, each glass sheet 108 being separated from an adjacent glass sheet 108 by a parting agent layer 110. The parting agent layer 110 reduces or even eliminates the sticking of the glass sheets 108 in the glass stack 106 during the ceramming process. Although not depicted in FIG. 1, in some embodiments, the glass stack 106 may further include a parting agent layer 110 between the glass sheet 108 and the setter plate 104. In other embodiments, such as in various embodiments described below, the setter plate 104 is made from a material that does not react with the glass sheet 108, and a parting agent layer 110 is not required to prevent interactions between the glass sheet 108 and the setter plate 104.

Generally, to form the glass-ceramic, the glass stack 106 is heated at a temperature above its annealing point for a time sufficient to develop crystal nuclei (also referred to as "nucleation"). The heat treatment can be performed, for example, in a lehr or furnace. After being heated above its annealing point, the glass is then further heated, usually at a higher temperature between the glass annealing point and the glass softening point, to develop the crystal phase (also referred to as "growth" or "crystallization"). In various embodiments, the heat treatment, or ceramming process, includes heating the glass stack to a nucleation temperature, maintaining the nucleation temperature for a predetermined period of time, heating the glass stack to a crystallization temperature, and maintaining the crystallization temperature for a predetermined period of time.

The glass sheets 108 may be made from any glass composition that is suitable for forming glass-ceramic articles, although it should be understood that the glass composition of the glass sheets 108 can impact the mechanical and optical properties of the glass-ceramic article. In various embodiments, the glass composition is selected such that the resultant glass-ceramic article has a petalite crystalline phase and a lithium silicate crystalline phase and wherein the petalite crystalline phase and the lithium silicate crystalline phase have higher weight percentages than other crystalline phases present in the glass-ceramic article.

Having described the stack configuration 100 in general, additional detail will now be provided with regard to the components of the stack configuration 100.

Carrier Plate

In various embodiments, the carrier plate 102 supports two or more setter plates 104. The structure and material of the carrier plate 102 may be selected to control the thermal uniformity of the glass sheets loaded on top of it in the stack configuration 100. In some embodiments, the carrier plate 102 has an open carrier design (shown in FIG. 2), while in other embodiments, the carrier plate 102 has a closed carrier design (shown in FIG. 3). In the embodiment depicted in FIG. 2, the carrier plate 102 is approximately 17% solid metal (e.g., steel), while the carrier plate 102 in the embodiment depicted in FIG. 3 is a hollow plate made of reaction bonded silicon carbide beams with approximately 45% solid metal.

Figure 3:
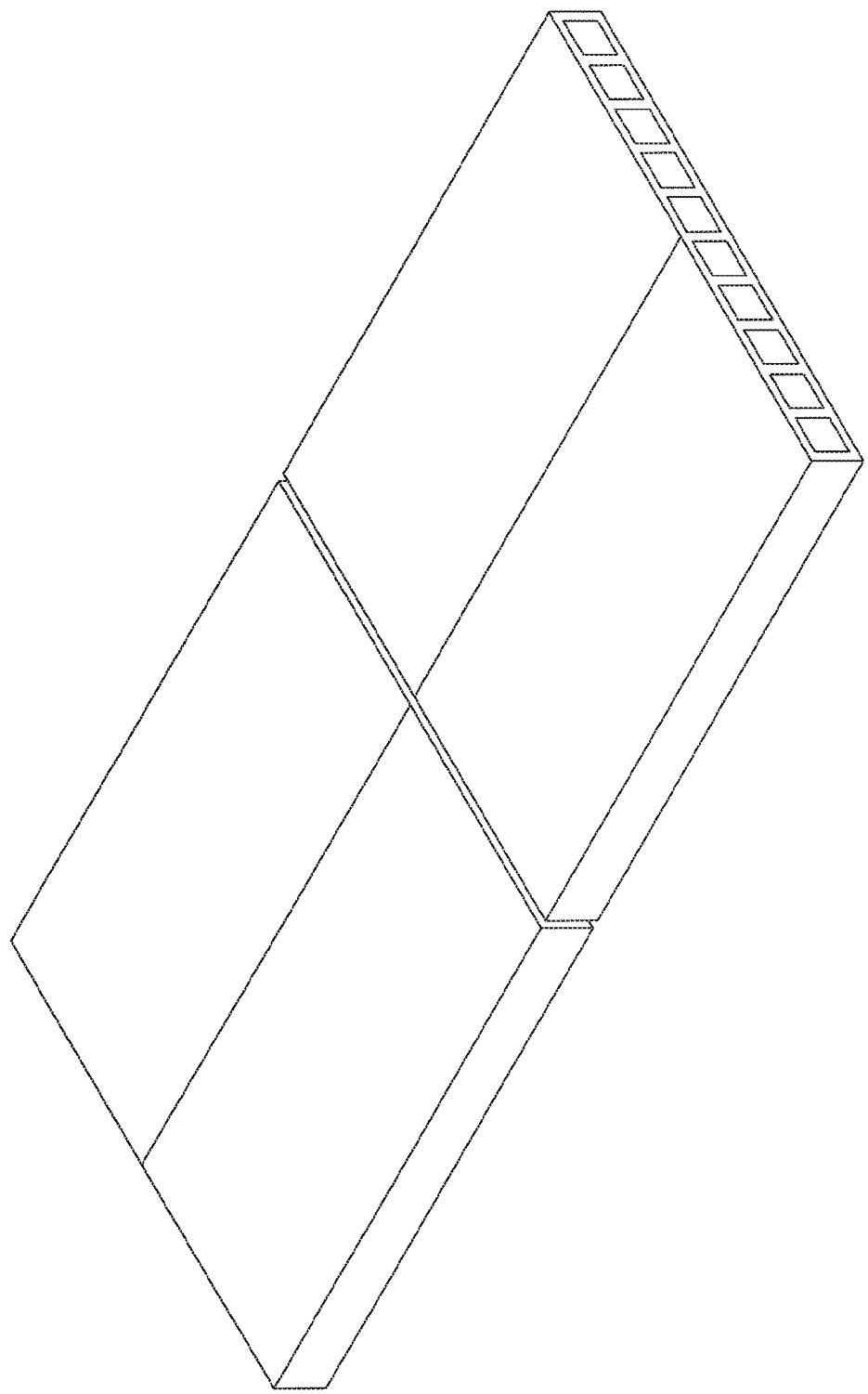
FIG. 3 is a schematic illustration of a carrier plate having a hollow plate configuration in accordance with one or more embodiments described herein.
Figure 4:
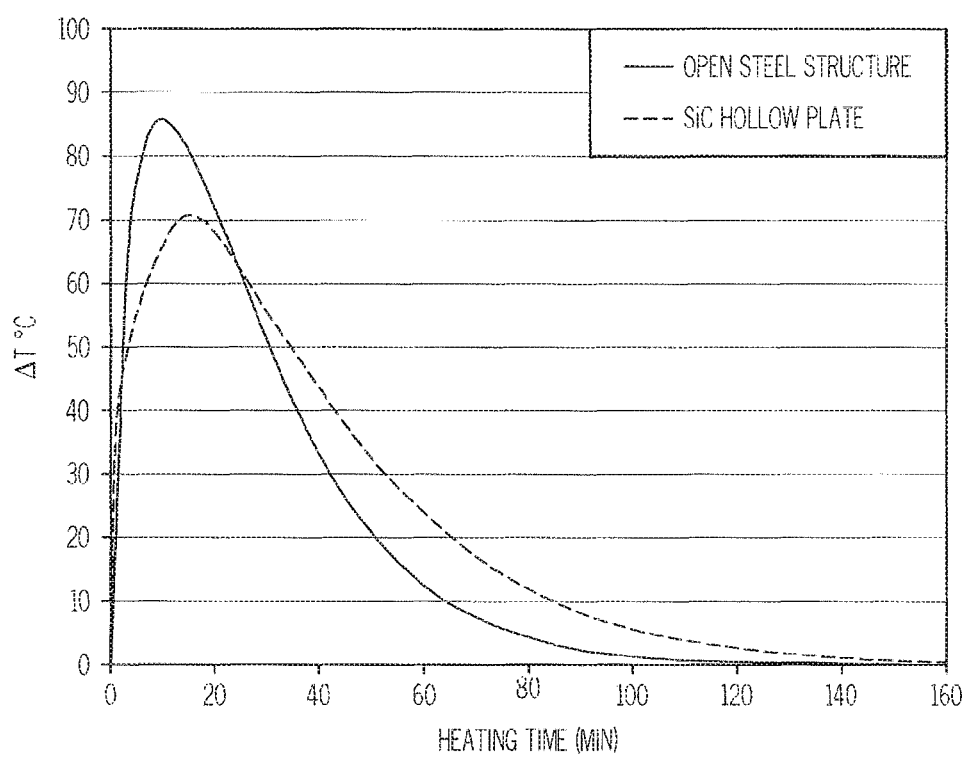
FIG. 4 is a graph plotting the modeled ΔT (° C.; y-axis) as a function of heating time (minutes; x-axis) for an open grid steel carrier plate and a silicon carbide hollow carrier plate in accordance with one or more embodiments described herein.

To evaluate the thermal impact of the carrier plate, a thermal model assuming production scale capacity with 9 stacks and 23 glass sheets in each stack on a carrier plate and 8 mm setter plates made from reaction bonded silicon carbide was run. As shown in the modeled data of FIG. 4, glass stacks on the hollow carrier plate exhibit reduced thermal uniformity as compared to glass stacks on the open steel carrier plate due to heat transfer. In particular, for the carrier made of silicon carbide beams (FIG. 3), larger glass stack temperature variations are expected as compared to the carrier made of the open steel grid design (FIG. 2), except at the very early stage of heating when the glass temperatures are low. Additionally, the blocking of direct radiation by the carrier plate also increases the overall heating time, despite the fact that the reaction-bonded silicon carbide is a better heat conductor than steel.

Figure 2:
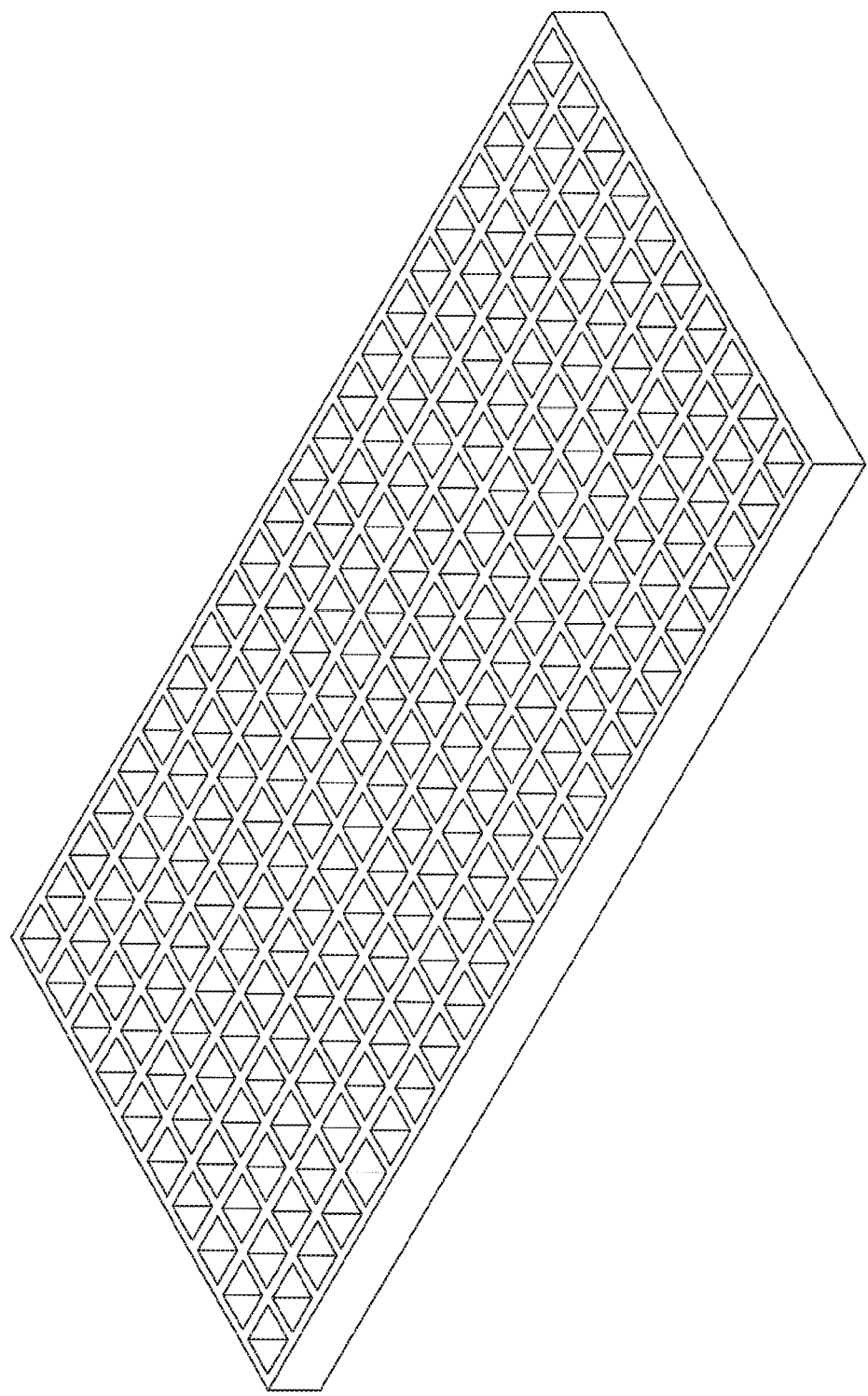
FIG. 2 is a schematic illustration of a carrier plate having an open grid configuration in accordance with one or more embodiments described herein.

Accordingly, although various designs and materials may be employed for the carrier plate 102, in various embodiments, the carrier plate is made from steel and has an open grid design, as depicted in FIG. 2.

Setter Plate

As shown in FIG. 1, in various embodiments, the carrier plate 102 supports at least two setter plates 104. For example, although the embodiment shown in FIG. 1 includes a single glass stack 106 with a setter plate 104 above the glass stack 106 and a setter plate 104 between the glass stack 106 and the carrier plate 102, it is contemplated that additional setter plates 104 may be included, such as being positioned within the glass stack 106, and/or by positioning multiple glass stacks 106 on the carrier plate 102, each glass stack 106 having at least a setter plate 104 above the glass stack 106 and a setter plate 104 between the glass stack 106 and the carrier plate 102.

While most conventional ceram processes utilize ceramic and refractory materials to form setter plates, such materials have heat transfer and heat capacity limitations which make them unsuitable for producing a high optical quality that is desired or required for certain applications. Additionally, setter plates made from such materials can experience thermal expansion, oxidation, and creep, which can in turn lead to warp in the glass ceramic article.

Moreover, the setter plates 104 binding the glass stack 106 provide a lateral heat transfer path to spread radiant heat from heating elements, which may lower the in-plane glass sheet temperature variations. Minimizing the temperature variations may in turn lead to a reduction in in-plane stresses and warp in the glass ceramic article. Accordingly, in various embodiments, the setter plates 104 are selected to maximize the reduction in glass sheet temperature variation. In particular, the setter plates 104 are selected to have a particular specific heat capacity, density, and thermal diffusivity.

According to various embodiments, the setter plates have a specific heat capacity ($c_p$) of from about 670 J/kg*K to about 850 J/kg*K, as measured in accordance with ASTM E1461 at room temperature. For example, the setter plates may have a specific heat capacity of from about 670 J/kg*K to about 850 J/kg*K, from about 670 J/kg*K to about 800 J/kg*K, from about 670 J/kg*K to about 750 J/kg*K, or from about 670 J/kg*K to about 700 J/kg*K, as measured in accordance with ASTM E1461 at room temperature and all ranges and subranges there between. Without being bound by theory, it is believed that when the specific heat capacity is outside of this range, the material is not able to give up heat and accept heat at the appropriate rate, which causes stress, and warp in the glass in stacking configurations.

The setter plates in various embodiments additionally or alternatively may be selected to have a bulk density of greater than about 2500 kg/m$^3$, as measured in accordance with ASTM C20. For example, the setter plates may have a bulk density of from about 2500 kg/m$^3$ to about 4000 kg/m$^3$, from about 2750 kg/m$^3$ to about 3750 kg/m$^3$, or from about 3000 kg/m$^3$ to about 3500 kg/m$^3$, as measured in accordance with ASTM C20 and all ranges and subranges there between. Without being bound by theory, it is believed that materials having bulk densities in this range have low porosity and do not significantly increase the weight in the stack. A bulk density that is too low can lead to material deterioration over time and decreased life use of the material, whereas a bulk density that is too high can lead to stress in the stack due to increased force on the glass.

Moreover, in various embodiments, the setter plates have a thermal diffusivity of greater than about 2.50×10$^{-5}$ m$^2$/s. For example, the setter plates may have a thermal diffusivity of from about 2.50×10$^{-5}$ m$^2$/s to about 5.50×10$^{-4}$ m$^2$/s, from about 3.0×10$^{-5}$ m$^2$/s to about 5.00×10$^{-4}$ m$^2$/s, from about 4.0×10$^{-5}$ m$^2$/s to about 4.50×10$^{-4}$ m$^2$/s, from about 4.50×10$^{-5}$ m$^2$/s to about 4.00×10$^{-4}$ m$^2$/s, from about 5.00×10$^{-5}$ m$^2$/s to about 3.50×10$^{-4}$ m$^2$/s, from about 5.50×10$^{-5}$ m$^2$/s to about 3.00×10$^{-4}$ m$^2$/s, from about 6.00×10$^{-5}$ m$^2$/s to about 2.50×10$^{-4}$ m$^2$/s, from about 6.50×10$^{-5}$ m$^2$/s to about 2.0×10$^{-4}$ m$^2$/s, from about 7.00×10$^{-5}$ m$^2$/s to about 2.00×10$^{-4}$ m$^2$/s, or from about 7.50×10$^{-5}$ m$^2$/s to about 1.50×10$^{-4}$ m$^2$/s and all ranges and subranges there between. Without being bound by theory, if the thermal diffusivity is too low, the material will take too long to heat up and cool down causing thermal gradients in the stack, which will lead to stress and warp. However, if the thermal diffusivity is too high, it could also lead to stress due to imparting thermal gradients in the stack. Glass sheets in contact with the setter plates would be affected by heat transfer at different rates as opposed to the glass sheets in the center of the stack. Thermal diffusivity a can be defined according to the following equation:

$$\alpha = \frac{k}{\rho c_p}$$

where k is thermal conductivity (W/m*K), p is density (kg/m$^3$), and $c_p$ is specific heat capacity (J/kg*K).

Accordingly, in various embodiments, the setter plates have a thermal conductivity (k) of greater than about 100 W/m-K, greater than about 125 W/m-K, greater than about 150 W/m-K, greater than about 175 W/m-K, or even greater than about 180 W/m-K, as measured in accordance with ASTM E1461 at room temperature. For example, the setter plate may have a thermal conductivity of from about 100 W/m-K to about 350 W/m-K, from about 125 W/m-K to about 325 W/m-K, from about 150 W/m-K to about 300 W/m-K, from about 175 W/m-K to about 275 W/m-K, or from about 180 W/m-K to about 250 W/m-K, as measured in accordance with ASTM E1461 at room temperature and all ranges and subranges there between. Without being bound by theory, thermal conductivity too high or too low can induce thermal gradients in the stack leading to stress and warp.

Various materials having the desired specific heat capacity, density, and thermal diffusivity may be suitable for use in forming the setter plates described herein. One example material that is particularly suitable for use is reaction-bonded silicon carbide (SiSiC). In embodiments, the setter plate 104 may comprise from about 85 wt % to about 90 wt % reaction bonded silicon carbide. The setter plate 104 may further comprise from about 10 wt % to about 15 wt % silicon metal (Si) and binding agents. Commercially available reaction bonded silicon carbide products that may be suitable for use in forming the setter plate 104 can include, by way of example and not limitation, CRYSTAR R™ available from Saint-Gobain Ceramic Materials.

To confirm the impact of the thermal properties of the material used to form the setter plates, three different materials were used to form setter plates having a thickness of 8 mm. In particular, Example A was formed from reaction-bonded silicon carbide, Comparative Example 1 was formed using nitride bonded silicon carbide, and Comparative Example 2 was formed using silicon refractory board. The thermal properties of each of these materials are provided in Table 1.

TABLE 1

Table 1: Thermal Properties of Setter Plate Materials

|  | Nitride Bonded SiC | Reaction Bonded (SiSiC) | Si Refractory Board |
|---|---|---|---|
| Thermal Conductivity at room temperature (W/m*k) | 31 | 185 | 0.6 |
| Bulk Density (kg/m$^3$) | 2200 | 3030 | 2100 |

TABLE 1-continued

Table 1: Thermal Properties of Setter Plate Materials

|  | Nitride Bonded SiC | Reaction Bonded (SiSiC) | Si Refractory Board |
|---|---|---|---|
| Specific Heat at room temperature (J/kg*K) | 663 | 670 | 878 |
| Thermal Diffusivity (m²/s) | 2.13E−05 | 9.11E−05 | 3.25E−07 |

Figure 5:
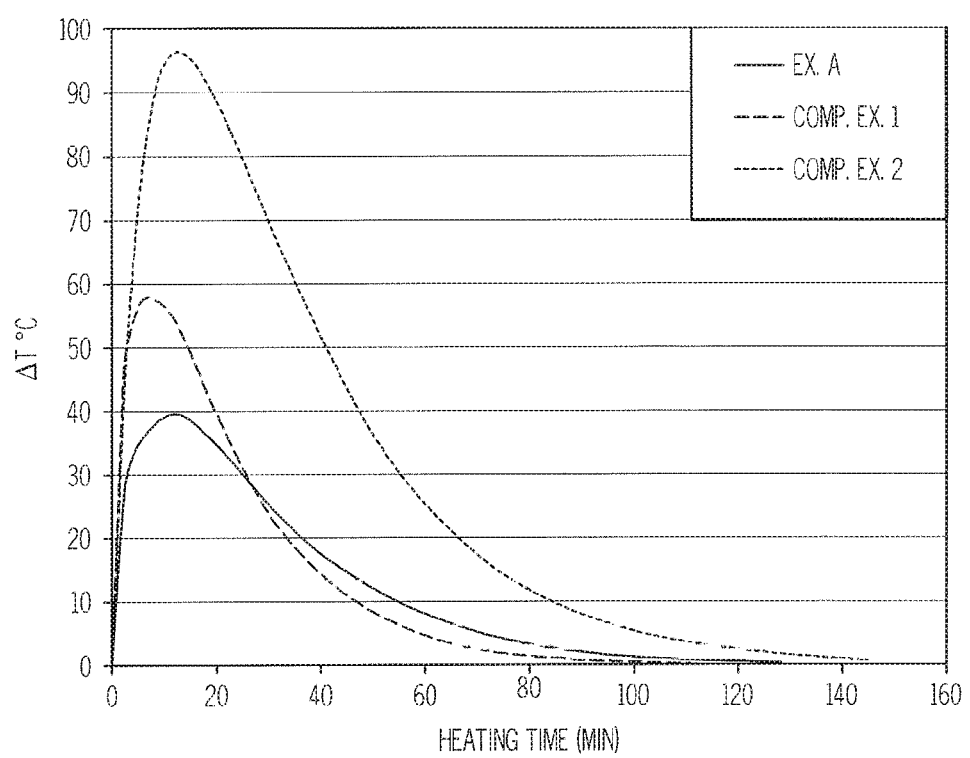
FIG. 5 is a graph plotting the modeled ΔT (° C.; y-axis) as a function of heating time (minutes; x-axis) for the setter plates of Example A and Comparative Examples 1 and 2.

The ΔT of the glass stack during heating ramp up was measured. The results are shown in FIG. 5. In particular, as shown in FIG. 5 the reaction bonded silicon carbide exhibits a reduced heating time and a reduced ΔT during the process. Comparative Example 2 using setter plates formed from silicon refractory board exhibited a significantly larger temperature variation, most likely because it is a poor heat conductor. However, the larger thermal diffusivity of Example A and Comparative Example 1 (nitride-bonded silicon carbide) showed more uniform temperatures.

Figure 6:
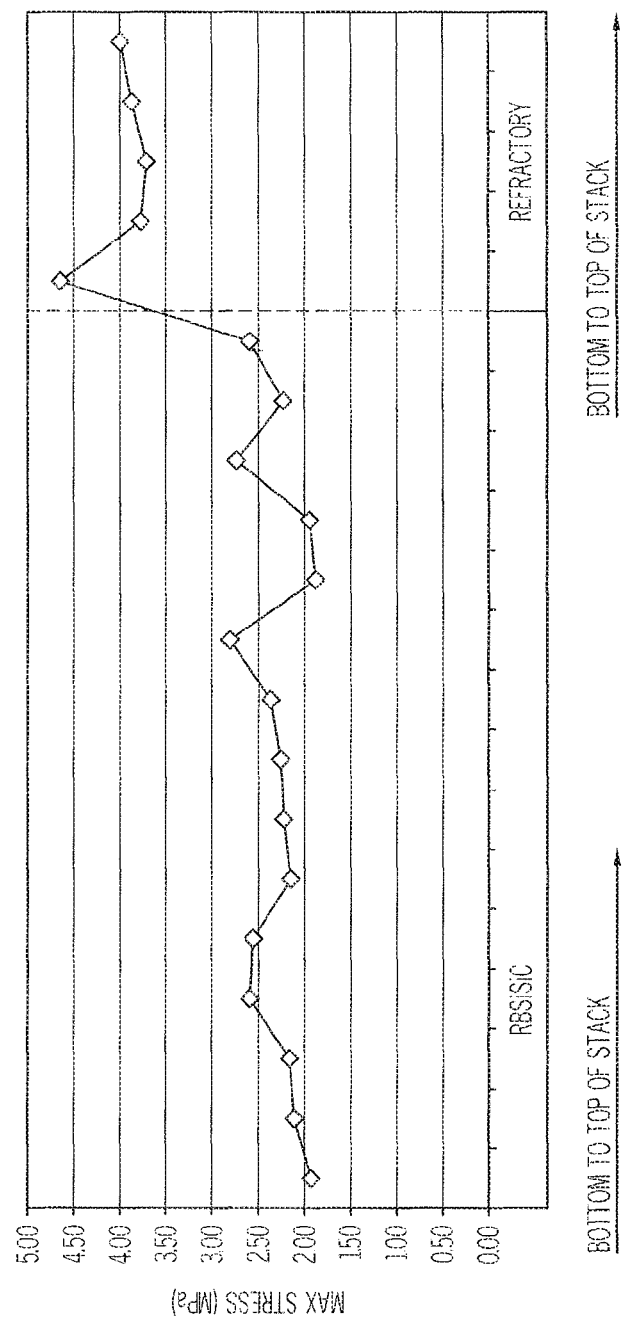
FIG. 6 is a graph plotting the maximum stress (MPa; y-axis) for two different setter materials in which reaction bonded silicon carbide is used on the left and silicon refractory board is used on the right.

In addition to decreasing the temperature variation in the glass stack, the setter plate 104 of various embodiments is made from a material that imparts lower stress as compared to conventional materials. For example, the thermal diffusivity of the reaction-bonded silicon carbide imparts lower stress in the glass ceramic article following ceramming heat treatment as compared to conventional setter plate materials. As shown in FIG. 6 the reaction bonded silicon carbide produced a lower maximum stress on the stacks (left hand side of the graph) as compared to stacks in contact with a silicon refractory board setter plate (right hand side of the graph). Without being bound by theory, it is believed that the reduced temperature delta resulting from the thermal diffusivity of the reaction-bonded silicon carbide reduces stress in the glass ceramic article as it grows crystals and phase transformation occurs in the article. The stress reduction directly impacts the warp in the glass ceramic article. In particular, increased stresses induce higher warp in the article, which can make it unusable for certain applications, such as handheld electronic displays. However, the use of reaction bonded silicon carbide reduces the stress in the glass ceramic article, thereby providing low warp in the final product.

Figure 7:
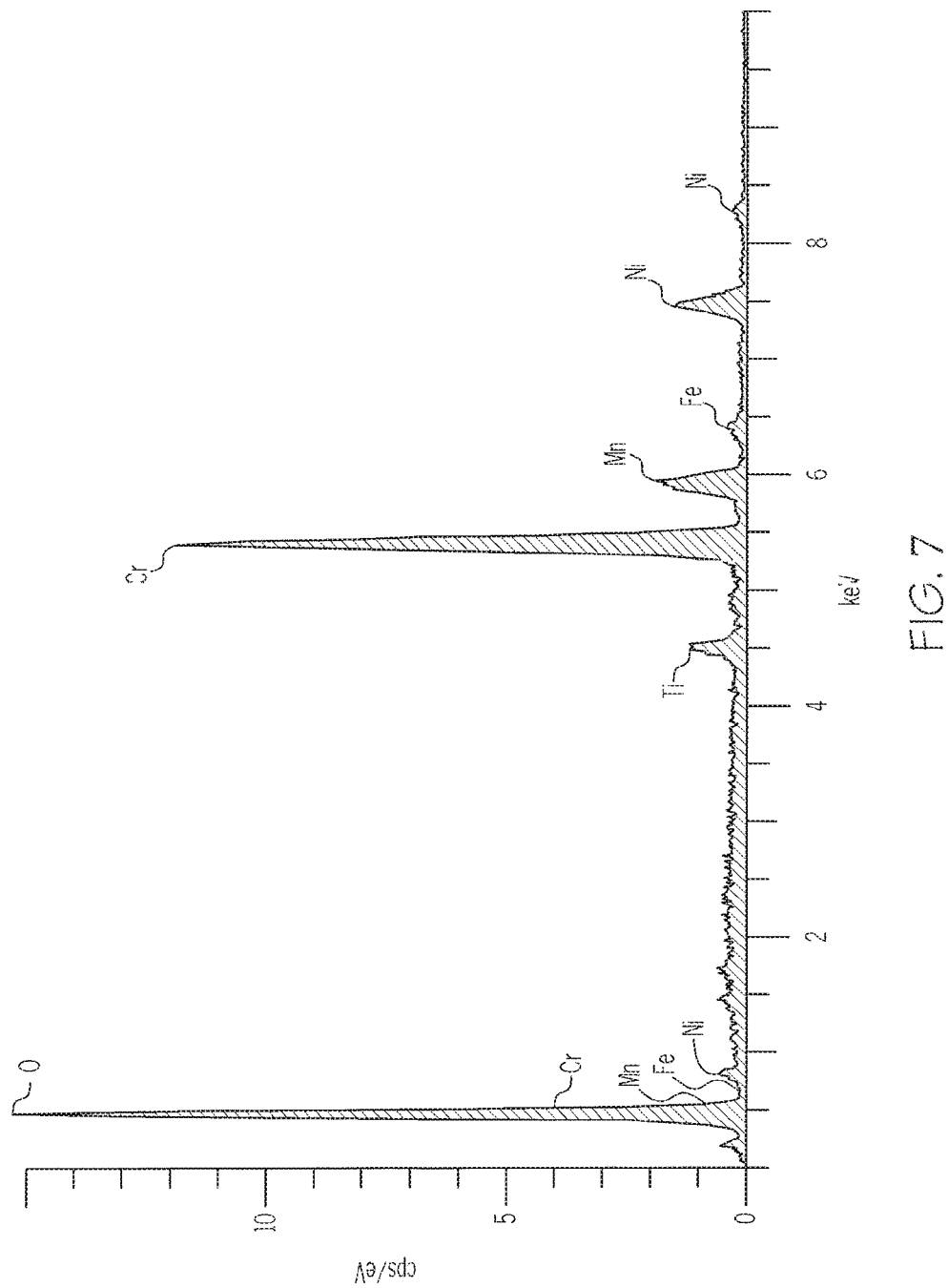
FIG. 7 depicts EDX (energy dispersive X-ray) showing the lack of Si on the surface of reaction-bonded silicon carbide setter plates post ceramming in accordance with one or more embodiments described herein.

In various embodiments, the material used to form the setter plate 104 is further selected based on its lack of reactivity with both the carrier plate 102 and the glass ceramic article. Reaction bonded silicon carbide is an example material that demonstrates low or even no reaction with materials typically used to form the carrier plate 102. In particular, setter plates made from reaction bonded silicon carbide in contact with stainless steel alloy and Ni-based super alloy metal carrier plates were tested up to 800° C. in air for 24 hour and for 100 hours. As shown in FIG. 7, SEM (scanning electron microscope) and EDX examination showed that there was no reaction of the metals with the reaction bonded silicon carbide. Specifically, the lack of Si found on the carrier plate surfaces showed that there was no reaction with the free Si in the reaction bonded silicon carbide microstructure.

Figure 8:
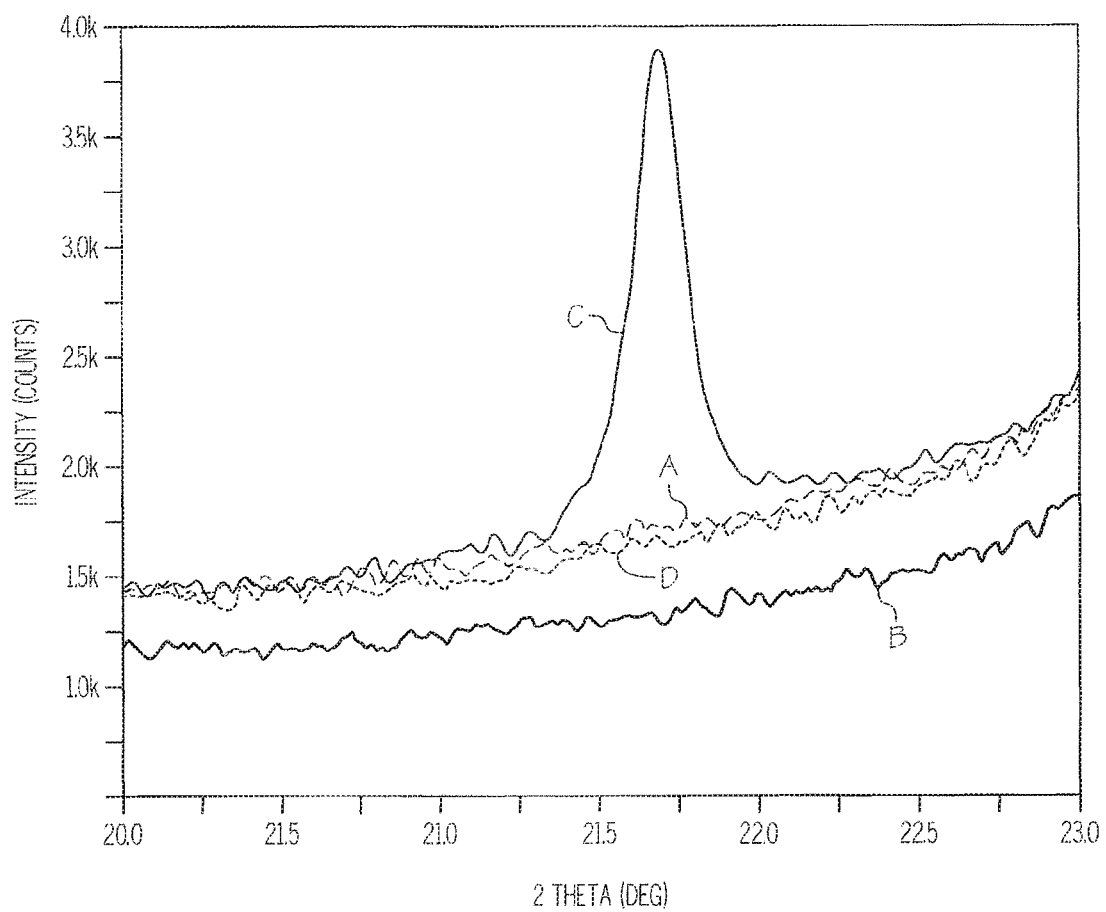
FIG. 8 depicts the XRD (X-ray diffraction) of various glass ceramic articles in accordance with one or more embodiments described herein.

Moreover, Li-based glass ceramics in contact with reaction bonded silicon carbide material during a thermal ceramming process do not exhibit any skin effects, according to XRD phase assemblage characterization. For example, as shown in FIG. 8, the glass in contact with the reaction bonded silicon carbide setter plate (A) is similar in phase to the bulk glass (B).

In addition to having improved thermal properties over other materials, reaction bonded silicon carbide has a low porosity (<1%), which can increase the life of the setter plate during thermal cycling due to increased resistance to oxidation, cracking, and reactivity through diffusion with other elements and materials.

In various embodiments, the setter plate 104 is also dimensioned to reduce warp in the glass ceramic article. In particular, the thickness of the setter plate 104 and the flatness of the setter plate 104 are controlled to reduce both warp and stress in the glass ceramic.

Figure 9:
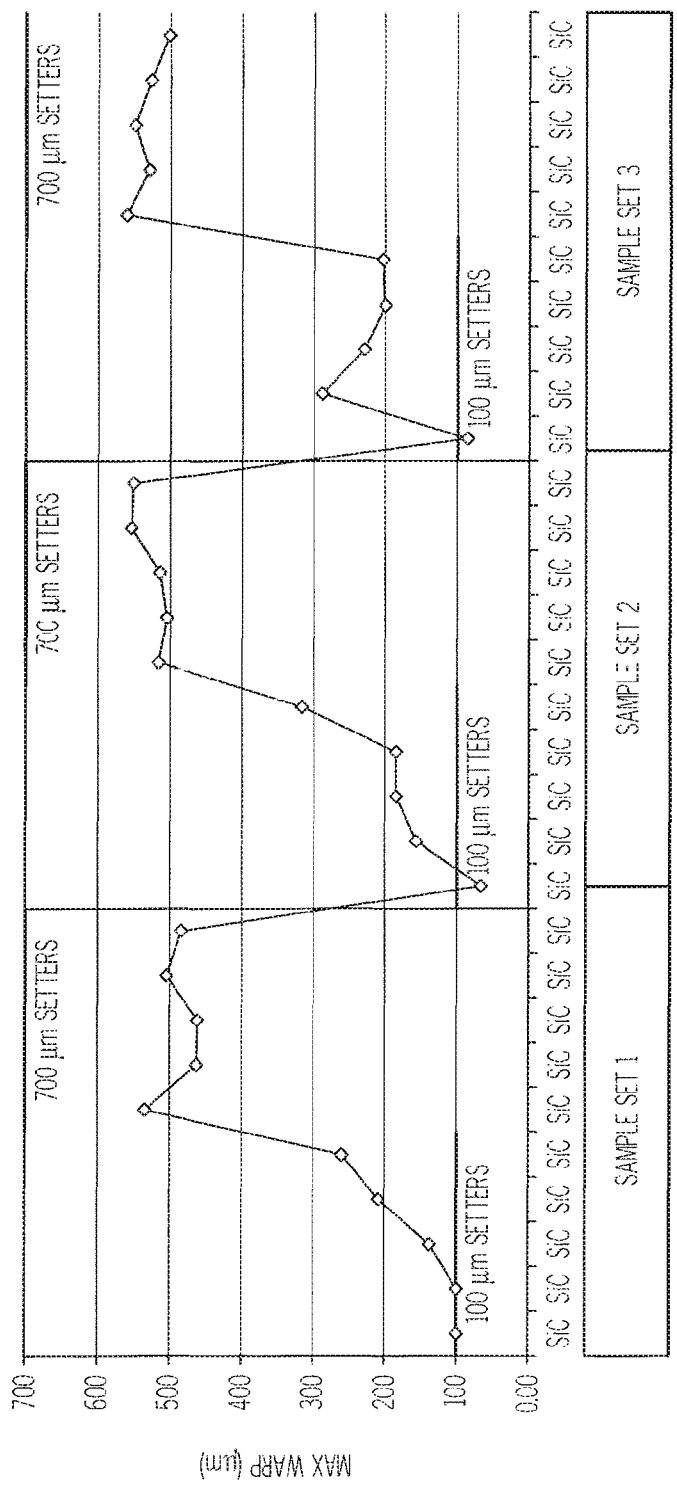
FIG. 9 is a graph of the maximum warp (μm; y-axis) for various setter plate flatnesses and additional weight in accordance with one or more embodiments described herein.

During the ceramming process, the glass sheets 108 forming the glass stack 106, which is in contact with the setter plates 104, move and conform to the flatness of the setter plate 104. In various embodiments, the setter plate 104 may be machined to obtain a particular flatness after formation. As used herein, the term "flatness" refers to a tolerance zone defined by two parallel planes within which the surface lies. For example, a flatness of 100 µm means that the surface must lie entirely between two parallel planes that are at most 100 µm apart. The impact of the flatness of the setter plate 104 on the flatness of the glass ceramic article is shown in FIG. 9. Specifically, as shown in FIG. 9, the maximum warp of the glass ceramic article is decreased for setter plates having a flatness of 100 µm as compared to setter plates having a flatness of 700 µm.

FIG. 9 further demonstrates that the use of additional weight (e.g., double weight as used in Sample Set 1) does not significantly reduce warp. For example, for each of Sample Set 1, Sample Set 2, and Sample Set 3, the first five samples of each set were performed using a setter with a flatness of 100 µm, while the last 5 samples of each set were performed using a setter with a flatness of 700 µm. The flatter setter reduced the warp to approximately the same amount independent of the weight, as shown by comparing Sample Set 1, which had double weight, to Sample Sets 2 and 3, each of which have equalized weight. Subsequent experiments show that extra setters on top of the stack may reduce warp, possibly due to weight or impact on the thermal treatment experienced by the glass.

In various embodiments, the setter plate 104 has a maximum flatness of less than or equal to about 100 µm, less than or equal to about 75 µm, less than or equal to about 50 µm, less than or equal to about 45 µm, less than or equal to about 40 µm, less than or equal to about 35 µm, less than or equal to about 30 µm, or even less than or equal to about 25 µm.

Figure 10:
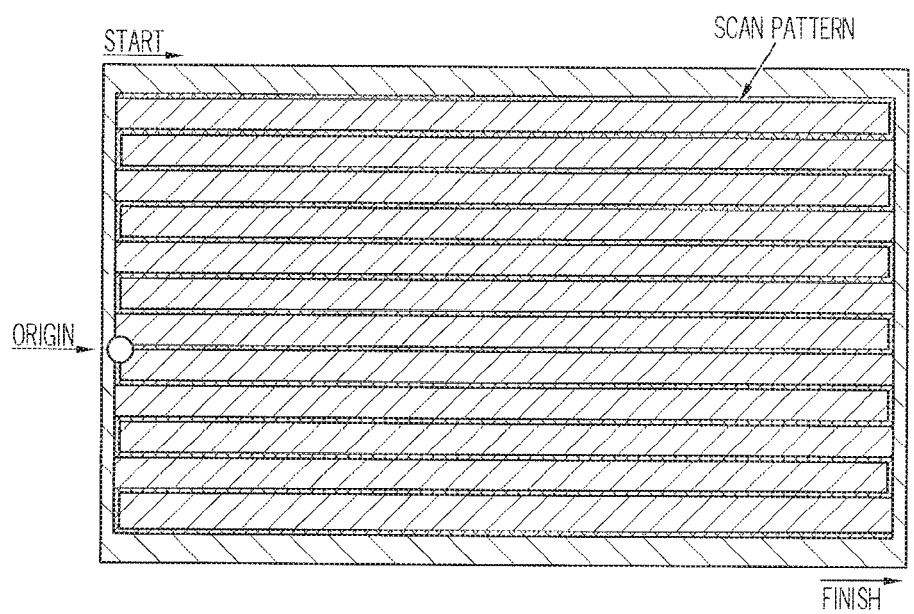
FIG. 10 is a schematic illustrating the scan pattern for the CMM (coordinate measuring machine) measurement of the flatness of setter plates in accordance with one or more embodiments described herein.

Flatness can be measured using a CMM and touch and/or non-touch probes. In various embodiments, the measurement density is 1 point/mm throughout the sweep trajectory and the measurement region is about 10 mm inbound from a side of the setter plate. The origin of alignment is at the center of the shorter edge, as shown in FIG. 10. To locate the origin, the CMM finds the corners of the setter plate 104 and calculates the distance between the two corners. The origin is the distance divided by two. To determine the region of inspection, the probe is moved 10 mm horizontally inbound from edge of the setter plate at the origin. Then, the probe is moved upwards about 325 mm to the start point. The sweep begins at that point. Spacing between each line is about 15 mm, and the setter plate is scanned in a serpentine pattern, as shown in FIG. 10. Flatness is evaluated by the CMM using the minimum zone method.

The thickness t of the setter plate 104 (shown in FIG. 1) is selected, at least in part, to balance the thermal effects of the setter plate 104 on the glass stack 106 with inducement of warp. In particular, the thickness should be minimized for heat transfer and uniformity, yet maximized for strength and warp resistance. Accordingly, in various embodiments, the setter plate 104 has a thickness t of from about 6.5 mm to about 10 mm, or from about 7 mm to about 9.5 mm, or from about 7.5 mm to about 9 mm, or from about 7.9 mm to about 8.2 mm and all ranges and subranges there between.

Figure 11:
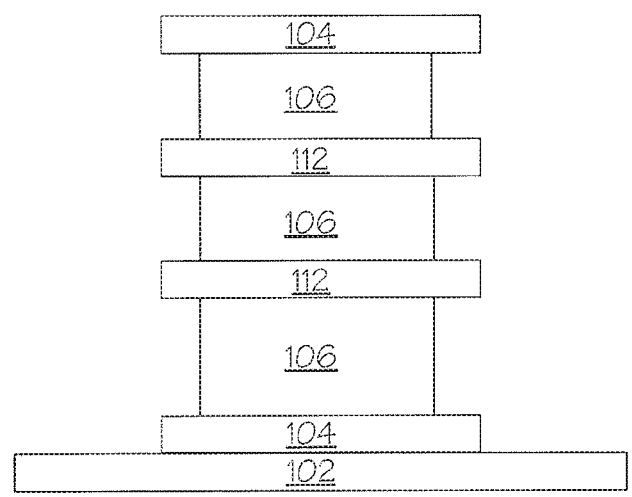
FIG. 11 is a schematic illustration of a glass stack configuration including interlayer setter plates in accordance with one or more embodiments described herein.

The density of the material used to form the setter plate 104 and the thickness of the setter plate 104 may further be selected based on the applied force on the glass stack 106. FIG. 11 illustrates how additional force on the glass stack can contribute to increased stress in the glass ceramic article. In particular, as shown in FIG. 11, the addition of weight not only did not improve the warp (e.g., decrease the maximum warp), but it further increased the maximum stress at various points within the glass stack. Without being bound by theory, it is believed that the addition of additional force constrains the glass sheets during the ceramming process when shrinkage occurs. Accordingly, it is believed that the ability of the material to move freely during the ceramming process decreases warp in the glass ceramic article. In various embodiments, setter plates 104 made from reaction bonded silicon carbide may provide good heat transfer while maintaining low applied force, thereby resulting in low warp and stress in the glass ceramic article.

Glass Stack Configuration

In various embodiments described herein, multiple glass sheets 108 are arranged in a glass stack 106 for the ceramming process. In addition to the variables described above as impacting the warp and stress of the final glass ceramic article, it was further discovered that various elements of the glass-stacking configuration have an impact on the warp and stress of the glass ceramic article.

Figure 12:
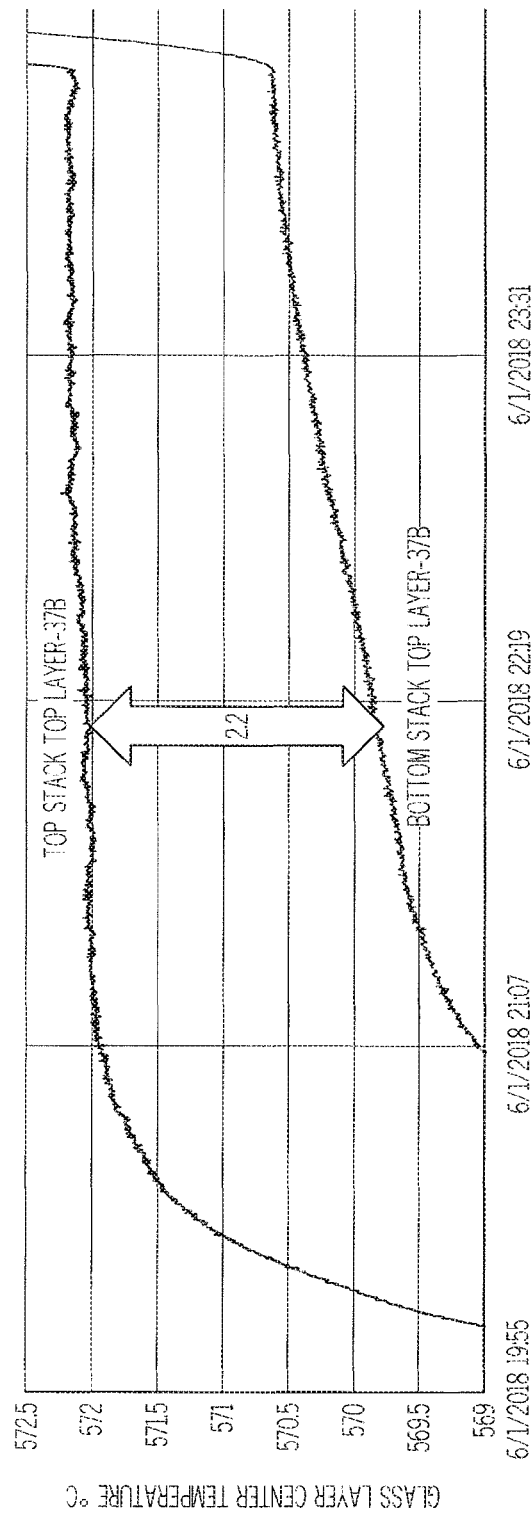
FIG. 12 is a graph plotting the glass layer center temperature (° C.; y-axis) as a function of time (x-axis) for the top sheet of glass in a glass stack and the bottom sheet of glass in the glass stack in accordance with one or more embodiments described herein.
Figure 13:
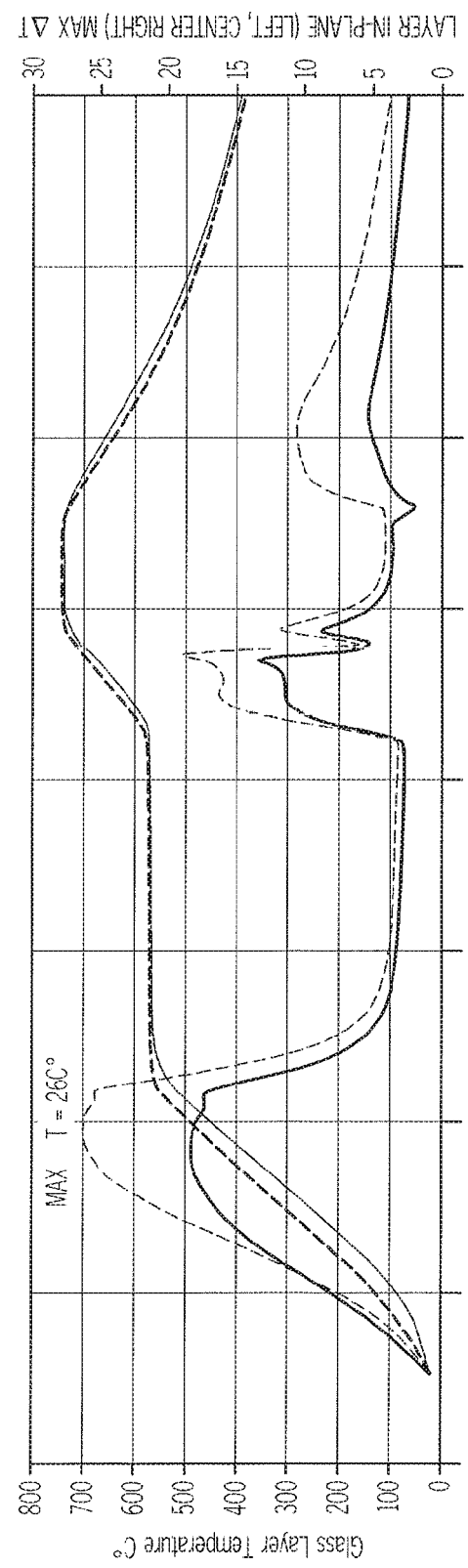
FIG. 13 is a graph plotting the glass layer temperature (° C.; y-axis) and temperature gradients across the sheets as a function of time (x-axis) during a ceramming process for the top sheet of glass in a glass stack and the bottom sheet of glass in the glass stack in accordance with one or more embodiments described herein.

Accordingly, in various embodiments, interlayer setter plates 112 may be placed within the glass stack 106, as shown in FIG. 11. The inclusion of the interlayer setter plates 112 can increase heat transfer and decrease the temperature lag from the top of the glass stack to the bottom of the glass stack. As shown in FIG. 12, when the temperature of each glass sheet in the stack including three interlayer setter plates is measured during the nucleation stage of the ceramming process, there is a 2.2° C. variability between the top layer of the top stack and the bottom layer of the bottom stack. Moreover, as shown in FIG. 13, although there remains a temperature differential during the ramping periods of the ceramming process, the inclusion of interlayer setter plates in the glass stack achieves temperature uniformity throughout the glass stack during the soaking periods.

Figure 14:
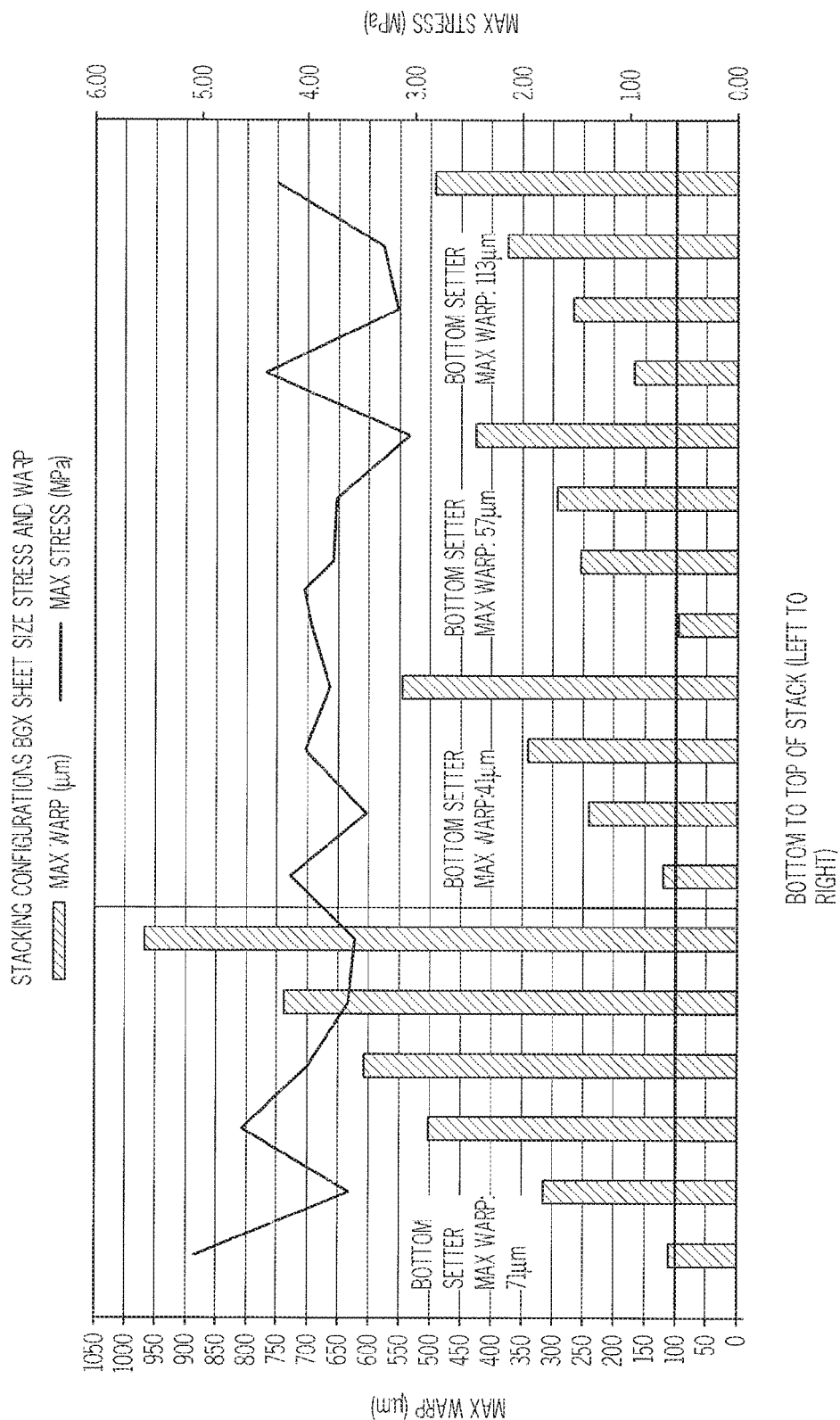
FIG. 14 is a graph illustrating the maximum warp (μm; left y-axis) as bars through the thickness of the glass stack for various amounts of applied force and the maximum stress (MPa; right y-axis) as a line graph for glass stacks without interlayer setter plates (left) and including interlayer setter plates (right) in accordance with one or more embodiments described herein.

Additionally, the inclusion of interlayer setter plates 112 reduces the warp and does not significantly impact the stress in the glass ceramic article, as shown in FIG. 14. Specifically, FIG. 14 shows that the inclusion of the interlayer setter plates 112 (right side of the graph) can reset the additive warp at each interlayer setter plate as compared to the increasing warp of the glass stack without interlayer setter plates (left side of the graph). The maximum stress is shown in FIG. 14 as the line graph, which does not increase with the addition of the interlayer setter plates.

In addition to including interlayer setter plates 112 within the glass stack 106, warp and stress in the glass ceramic article may further be controlled or reduced by limiting the number of glass sheets incorporated in the glass stack. For example, in some embodiments, the glass stack can be from 6 to 24 glass sheets, or from 10 to 20 glass sheets from setter plate 104 to setter plate 104. In embodiments in which interlayer setter plates are disposed within the glass stack, the number of glass sheets between each interlayer setter plate may be from 5 glass sheets to 15 glass sheets, or from 6 glass sheets to 10 glass sheets.

Stack Mass

Crystallization of the glass when forming a glass ceramic, such as discussed below, is an exothermic process that can cause localized heating within the glass stack 106. This localized heating can cause thermal gradients within the stack in all directions of the stack. As will be shown in more detail below, these thermal gradients can lead to warp, or reduced flatness, in the glass sheets present in the stack. According to embodiments, the mass of glass in a glass stack can be controlled, such as, for example, by modifying the height of the glass stack, to control the thermal gradients caused by crystallization of glass.

Ceramming cycle, according to embodiments, will comprise a nucleation step at a given temperature, followed by a growth step at a higher temperature. The precursor glass composition and the ceramming cycle will determine the phase assemblage in the final product. According to embodiments, the cycle for ceramming comprised heating the precursor glass composition to 570° C. and holding at that temperature for four hours followed by heating to 740° C. and holding at that temperature for 1 hour.

Figure 15:
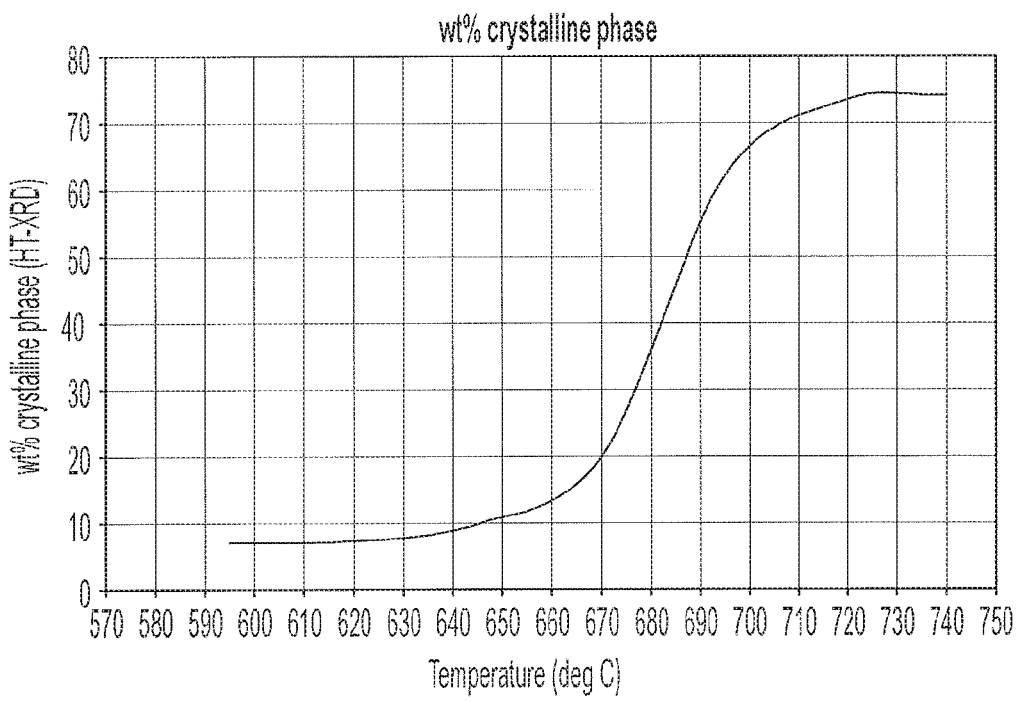
FIG. 15 graphically depicts the evolution of the crystalline phase content of glass-ceramic of glass ceramic articles during a ceramming cycle according to embodiments disclosed and described herein.
Figure 16:
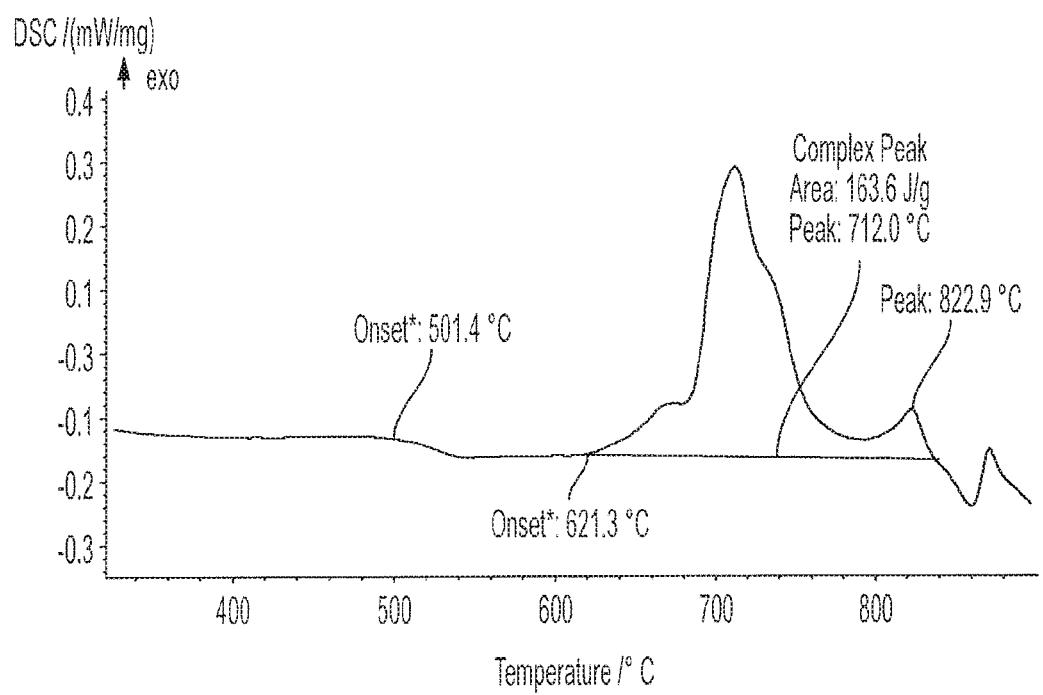
FIG. 16 graphically depicts calorimetry of the parent glass during heat treatment and to reveal exothermic reactions.

As shown in FIG. 15, when a precursor glass is ceramed with a heat treatment, the glass shows an increase in the amount of crystalline phases precipitated starting around 620° C., with a sharp increase in the crystalline phases in the temperature range from 680° C. to 700° C. range, which corresponds to the ramp from nucleation to growth. Between 570° C. and 740° C., the amount of crystalline phase in the material goes from less than 10 wt % to greater than 70 wt % (as measured by high-temperature XRD analysis of the surface of a sample during ceramming cycle, analyzed by Rietveld method). This phenomenon is shown graphically in FIG. 15 by the sharp increase in wt % of crystalline phase, and particularly in the steep increase from about 660° C. to about 710° C. Similarly, FIG. 16 shows differential scanning calorimetry versus temperature, which indicates the energy released from crystallization at certain temperatures within heat treatment. As shown in FIG. 16, according to embodiments, the energy released from crystallization increases rapidly at temperatures around 700° C., where crystalline phase formation is rapidly increasing (as shown in FIG. 16 Thus, a view of the of FIG. 15 and FIG. 16 shows that crystalline formation is an exothermic process that, as mentioned above, can cause temperature gradients in the glass stack.

Figure 17A:
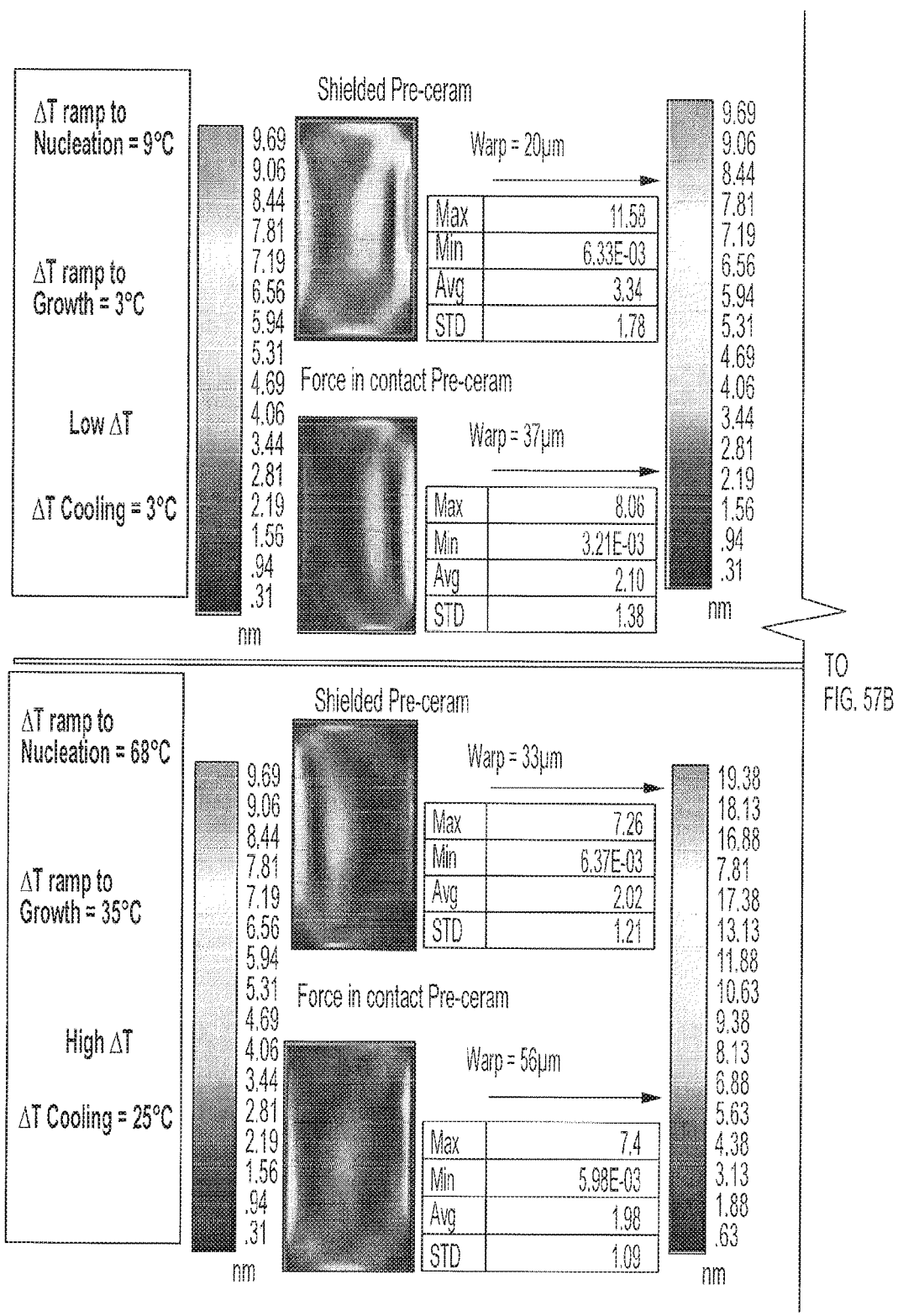
FIGS. 17A and 17B schematically depicts stress and warp of shielded glass ceramic articles and force in contact glass ceramic articles according to embodiments disclosed and described herein.
Figure 17B:
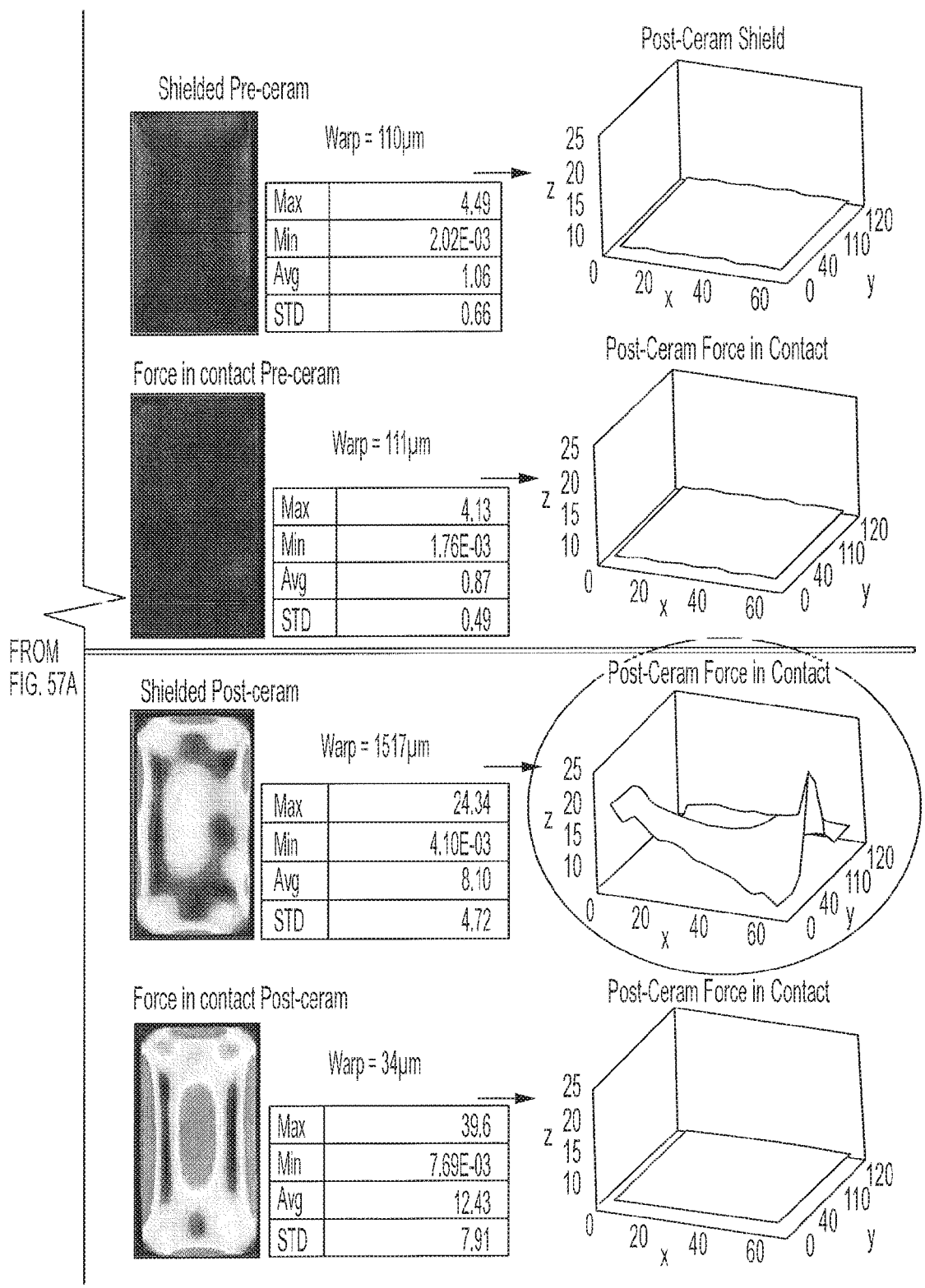

With reference now to FIG. 17, it is shown that when thermal gradients (ΔTs) are present in a glass sheet during the ramp from nucleation to growth, warp can be generated in the formed glass ceramic sheet if the glass sheet is not constrained underweight during the ceramming cycle in embodiments. Moreover, when the glass sheet is constrained underweight during the ceramming cycle, the glass sheet may not warp, but internal stresses can be caused by the ΔTs. This is evidenced In FIG. 17 where two samples were formed with low ΔTs and two samples were formed at high ΔTs (four total samples). One sample in the high ΔTs and one sample in the low ΔTs had force applied to the glass sheet, which are labeled as "Force in Contact" in FIG. 17. In addition, one sample in the high ΔTs and one sample in the low ΔTs had a component that did not apply force to the glass sheet, but had a setter placed at a predetermined distance from the surface of the glass sheet, thereby constricting the amount of warp in the glass sheet; these samples are labeled "Shielded" in FIG. 17.

FIG. 17 shows pre-ceram conditions for low ΔTs of a glass sheet that is force in contact and a glass sheet that is shielded. FIG. 17 also shows the warp and stresses in those glass sheets. The warp of the shielded glass sheet is 20 µm and there are average stresses of 3.34 MPa in the shielded glass sheet, and the warp of the force in contact glass sheet is 37 µm and there are average stresses of 2.10 MPa in the force in contact glass sheet. FIG. 17 shows post-ceram conditions for low ΔTs of a glass sheet that is force in contact and a glass sheet that is shielded. FIG. 17 also shows the warp and stresses in those glass sheets. The warp of the shielded glass sheet is 110 µm and there are average stresses of 1.06 MPa in the shielded glass sheet, and the warp of the force in contact glass sheet is 111 µm and there are average stresses of 0.87 MPa in the force in contact glass sheet. FIG. 17 graphically depicts the warp of the post-ceram shielded glass sheet and the post-ceram force in contact glass sheet.

FIG. 17 shows pre-ceram conditions for high ΔTs of a glass sheet that is force in contact and a glass sheet that is shielded. FIG. 17 also shows the warp and stresses in those glass sheets. The warp of the shielded glass sheet is 33 µm and there are average stresses of 2.02 MPa in the shielded glass sheet, and the warp of the force in contact glass sheet is 56 µm and there are average stresses of 1.98 MPa in the force in contact glass sheet. FIG. 17 shows post-ceram conditions for high ΔTs of a glass sheet that is force in contact and a glass sheet that is shielded. FIG. 17 also shows the warp and stresses in those glass sheets. The warp of the shielded glass sheet is 1517 µm and there are average stresses of 8.10 MPa in the shielded glass sheet, and the warp of the force in contact glass sheet is 34 µm and there are average stresses of 12.43 MPa in the force in contact glass sheet. FIG. 17 graphically depicts the warp of the post-ceram shielded glass sheet and the post-ceram force in contact glass sheet.

As shown in FIG. 17 thermal gradients (ΔTs) in the glass sheets during ceramming can cause warping and/or stresses in the glass sheet. Without being bound by any particular theory, these thermal gradients may be caused by the exothermic crystallization during the ceramming process.

Figure 18:
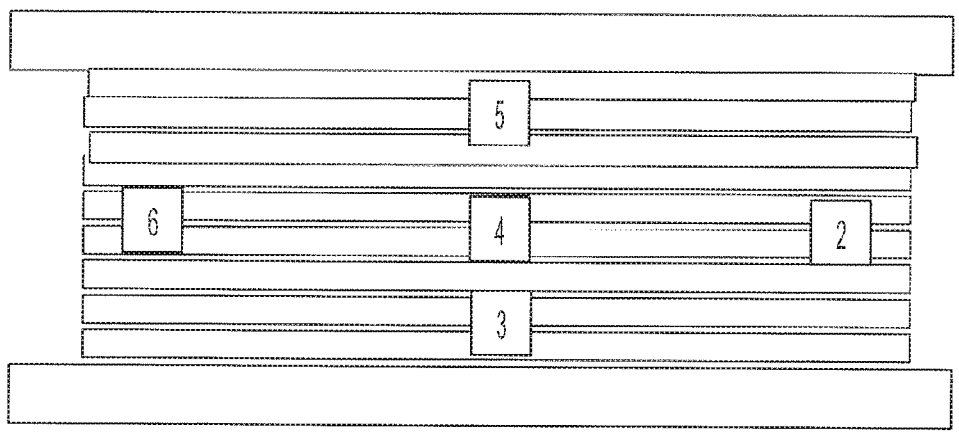
FIG. 18 schematically depicts locations of thermocouples within a stack according to embodiments disclosed and described herein.
Figure 19:
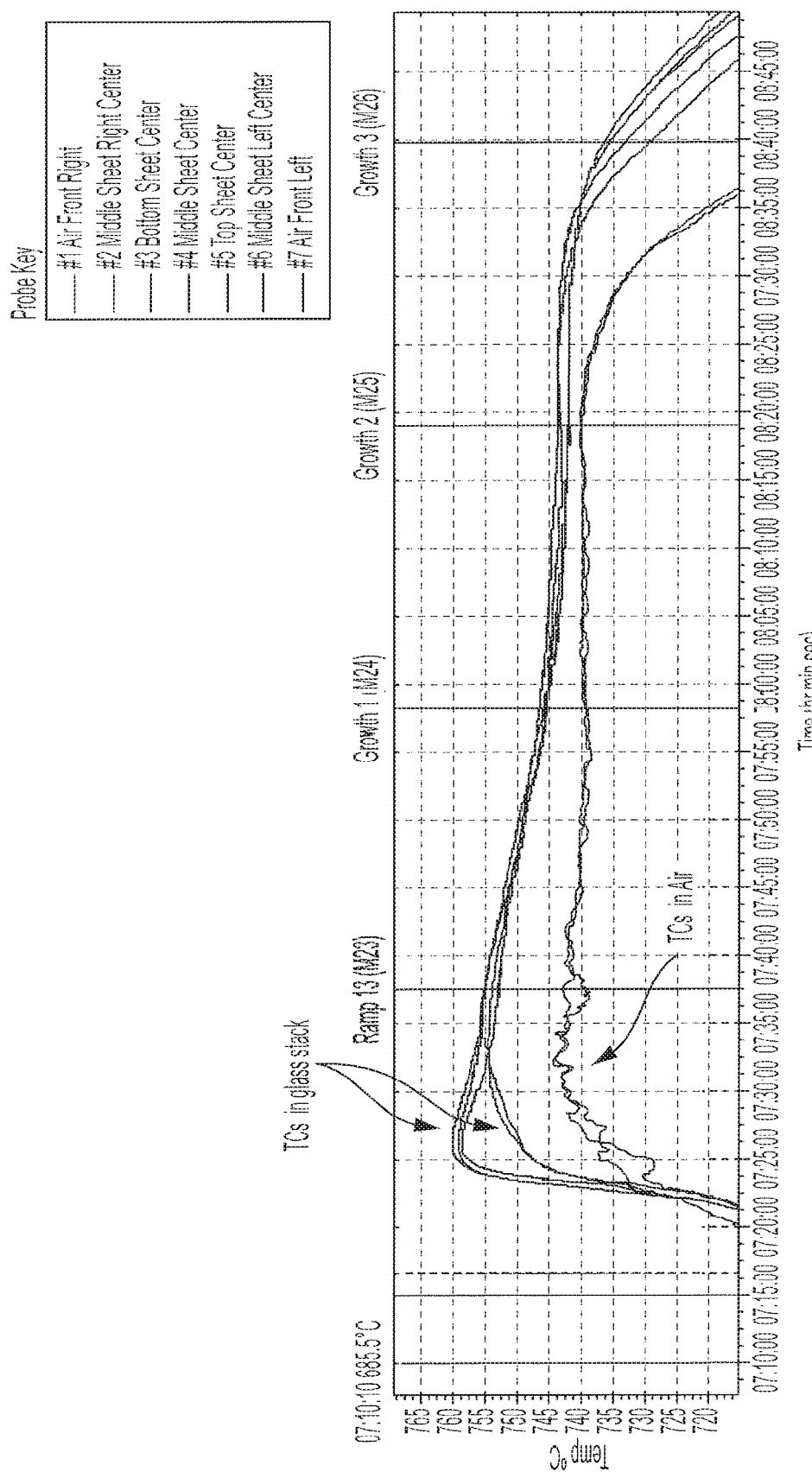
FIG. 19 graphically depicts temperatures read by thermocouples during a ceramming cycle according to embodiments disclosed and described herein.

During ceramming of stacks of glass sheets, the temperature increase within the glass stack during heating from the nucleation stage to the crystallization stage exceeds the temperature increase in the atmosphere in the heating chamber surrounding the glass stack. FIG. 18 shows the placement of thermocouples 2-6 within the glass stack. Namely, thermocouples 2 and 6 are positioned on the left and right side of the stack, respectively, and thermocouples 3-5 are positioned in the center of the stack at the bottom, middle, and top of the stack, respectively. In addition, thermocouples 1 and 7 were placed in the atmosphere of the heating chamber outside of the stack. FIG. 19 shows the temperature readings of the thermocouples during a ceramming cycle. As can be seen in FIG. 19, the thermocouples in the glass stack (thermocouples 2-6) read temperatures significantly higher than the thermocouples outside of the stack in the atmosphere of the heating chamber (thermocouples 1 and 7) during the crystallization step, which is from around 7:20 to around 7:30. During the temperature hold in the crystallization step, the temperature readings of the thermocouples in the glass stack approach the temperature readings of the thermocouples in the outside of the glass, which indicates that the exothermic crystallization of the glass sheet causes a spike in stack temperature during the heating from the nucleation step to the crystallization step.

This temperature difference between the glass stack and the atmosphere of the heating chamber increases as the stack height increases, or in other words, increases as the mass of glass within the stack increases. Table 2 shows six stack configurations having different stack heights and, correspondingly, different mass indexes (mass index is the thickness of the glass sheets multiplied by the number of sheets in the stack). A volume index which accounts for length and width may also be used.

TABLE 2

| Run | Stack Configuration (number of sheet in stack) | Thickness of each sheet (mm) | Mass Index |
|---|---|---|---|
| 1 | 23 | 1.11 | 25.3 |
| 2 | 23 | 1.11 | 25.3 |
| 3 | 10 | 1.11 | 11.0 |
| 4 | 15 | 1.11 | 16.5 |
| 5 | 23 | 1.11 | 25.3 |
| 6 | 3 | 4.3 | 12.9 |

Figure 20:
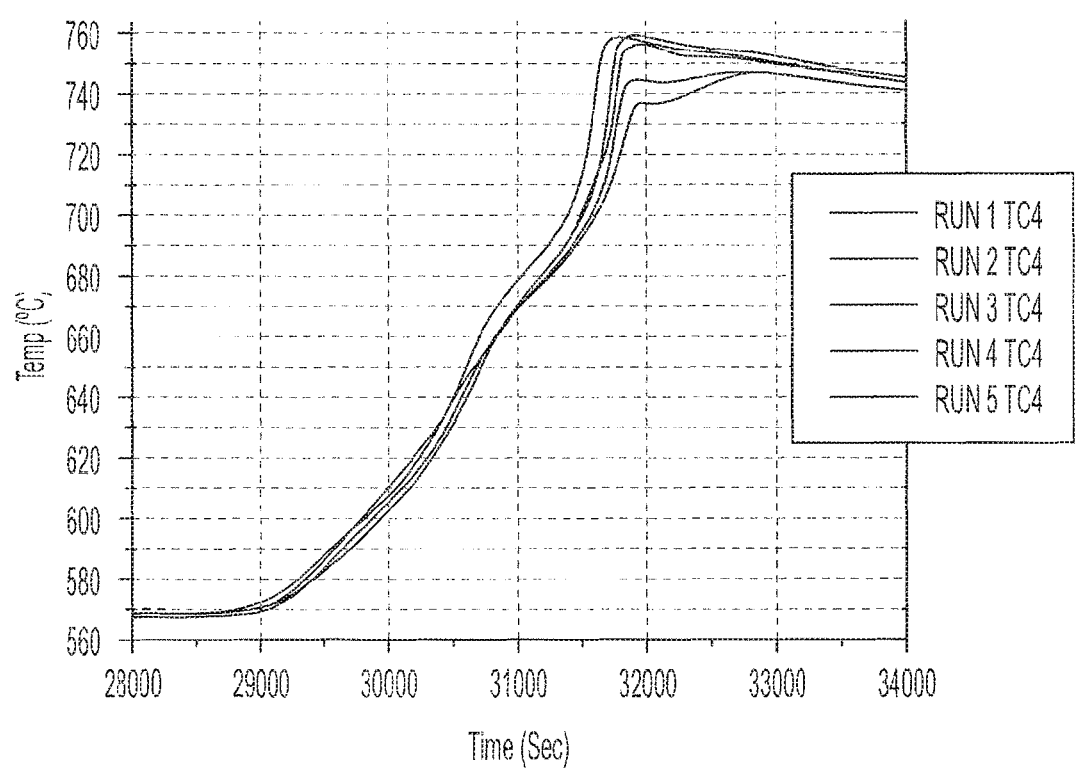
FIG. 20 graphically depicts temperatures read by thermocouples during a ceramming cycle according to embodiments disclosed and described herein.

The ceramming cycle disclosed above was run on stacks having the configurations disclosed in Table 2 above. FIG. 20 graphically depicts the results of this test, which were conducted on sheets have dimensions—other than thickness—of 260 mm×680 mm. As disclosed above, the ceramming cycle heats the atmosphere of a heating chamber, such as, for example a lehr or an oven, from a nucleation hold of about 540° C. to a crystalline growth temperature of 740° C., where the atmosphere of the heating chamber is held at 740° C. for a duration of time. Thus, glass stacks that have the smallest effect of the exothermic crystallization will have maximum temperatures that are closest to 740° C. As shown in FIG. 20, glass stacks having a lower mass index will have a maximum temperature. In particular, Runs 3 and 4 in Table 2, which include stacks having a mass index of 11.0 and 16.5, respectively, have maximum temperatures that are closer to 740° C. than Runs 1, 2, and 5, which all include stacks having a mass index of 23. This data indicates that stacks having lower mass indexes will have less effects of the exothermic crystallization and, thereby will have less temperature gradients and less warp.

Figure 21:
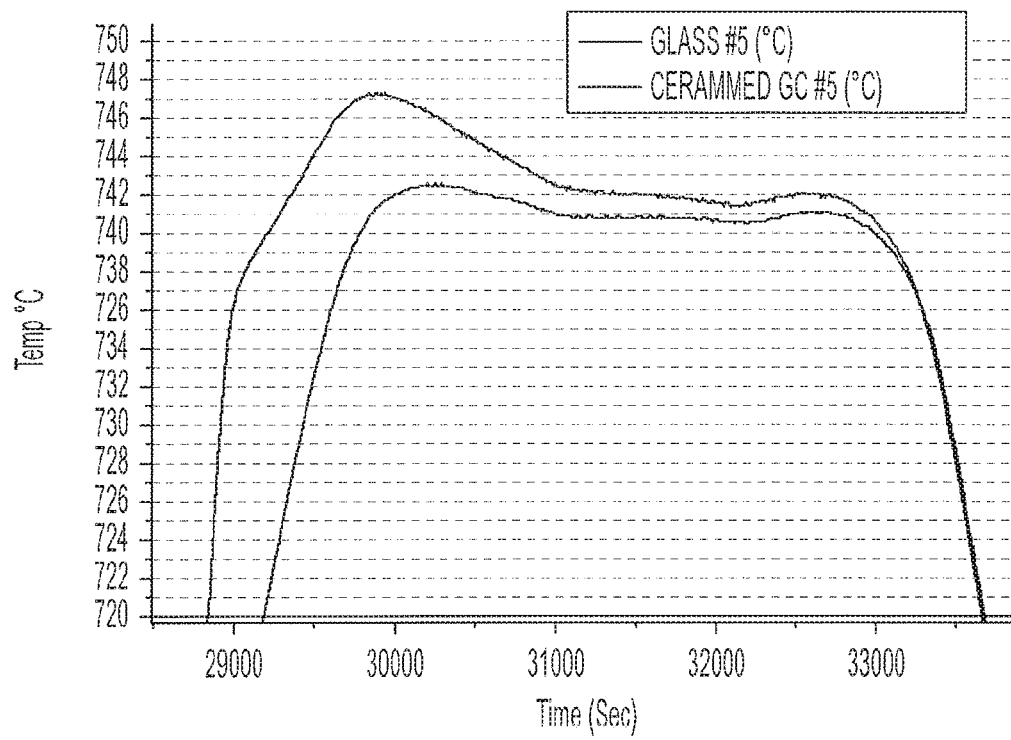
FIG. 21 graphically depicts temperatures read by thermocouples during a ceramming cycle of a glass sheet and a cerammed sheet according to embodiments disclosed and described herein.
Figure 22:
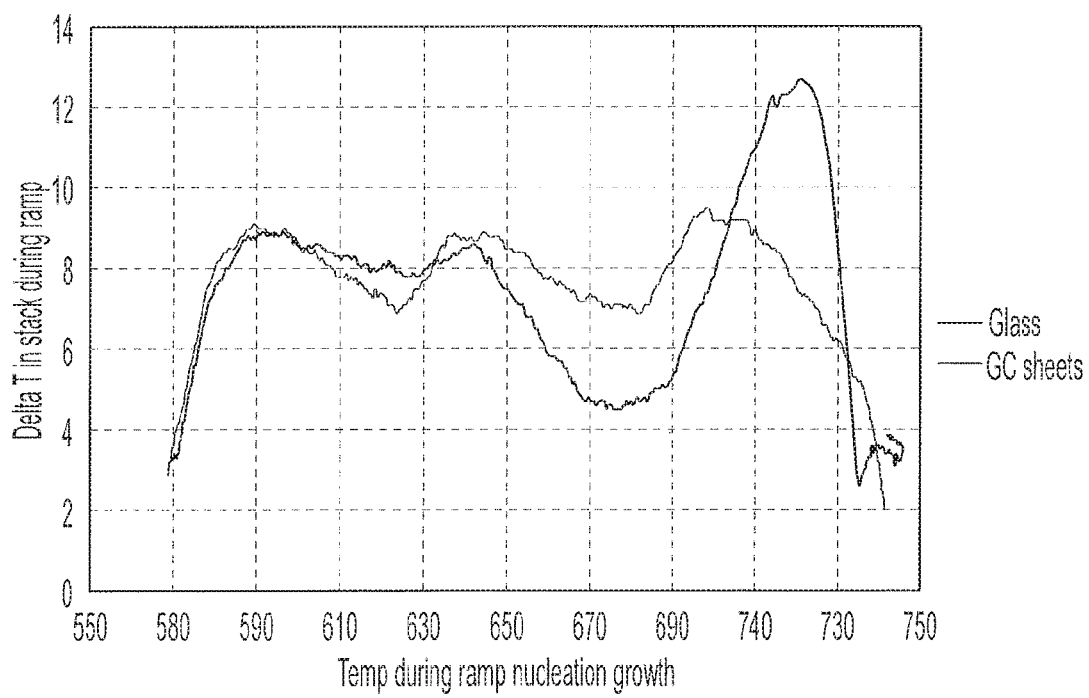
FIG. 22 graphically depicts temperatures read by thermocouples during a ceramming cycle of a glass sheet and a cerammed sheet according to embodiments disclosed and described herein.

The impact of the exothermic crystallization is further confirmed by a comparison of two cycles using the configuration of Run 6 in Table 2 above. In the first cycle glass sheets were used that underwent nucleation and crystallization, and in the second cycle the same crystallized glass sheets used for the first cycle were subjected to the cycle again. In this way, a comparison is made of sheets that undergo crystallization in the first cycle and sheets that do not undergo crystallization in the second cycle—because the sheets were already crystallized in the first cycle. Accordingly, little to no exothermic crystallization is expected in the second cycle because the sheets have already undergone crystallization and will not crystallize a second time. This is confirmed as shown in FIG. 21, which graphically depicts the results of the stack temperature during the cycle. In FIG. 21 the glass sheets showed increased temperatures during the cycle (particularly during the crystallization step), while the crystallized sheets did not show increased temperature during the cycle. However, the temperatures of the glass stack and the temperatures of the crystallized stacks are relatively similar during the other parts of the cycle and only differ significantly while heating from the nucleation step to the growth step (i.e., the temperature range where significant crystallization events and exothermic reactions are known to occur). FIG. 22 graphically compares the temperature readings of thermocouples within the stack and thermocouples outside of the stack using the thermocouple configuration disclosed in FIG. 18. As shown in FIG. 22, the temperature within the stack does not exceed the temperature in the air surrounding the stack for these crystallized sheets.

The exothermic crystallization can also effect the temperature gradients across the stack. Using the thermocouple configuration disclosed in FIG. 18, temperatures at multiple locations within the stack are measured during the cycle. For the stack of crystallized sheets, the temperature is more uniform throughout the stack, as shown in FIG. 22. Thus, the magnitude of the thermal gradients throughout the stack increases with increased magnitude of overshoot. The stack of glass sheets, which experiences the exothermic reactions due to crystallization during this thermal treatment, show increased thermal gradients above 700° C. As shown above, thermal gradients in the glass sheets can lead to increased warp and/or stresses in the sheets.

To moderate the temperature gradients that occur during the ceramming cycle, in embodiments, stacks of glass sheets have a mass index less than or equal to 35, such as less than or equal to 34, less than or equal to 33, less than or equal to 32, less than or equal to 31, less than or equal to 30, less than or equal to 29, less than or equal to 28, less than or equal to 27, less than or equal to 26, less than or equal to 25, less than or equal to 24, less than or equal to 23, less than or equal to 22, less than or equal to 21, less than or equal to 20, less than or equal to 19, less than or equal to 18, less than or equal to 17, less than or equal to 16, less than or equal to 15, less than or equal to 14, less than or equal to 13, less than or equal to 12, less than or equal to 11, or less than or equal to 10. It should be understood that the minimum mass index is not limited and can be any number greater than 0.

Sheet Configuration

Figure 23:
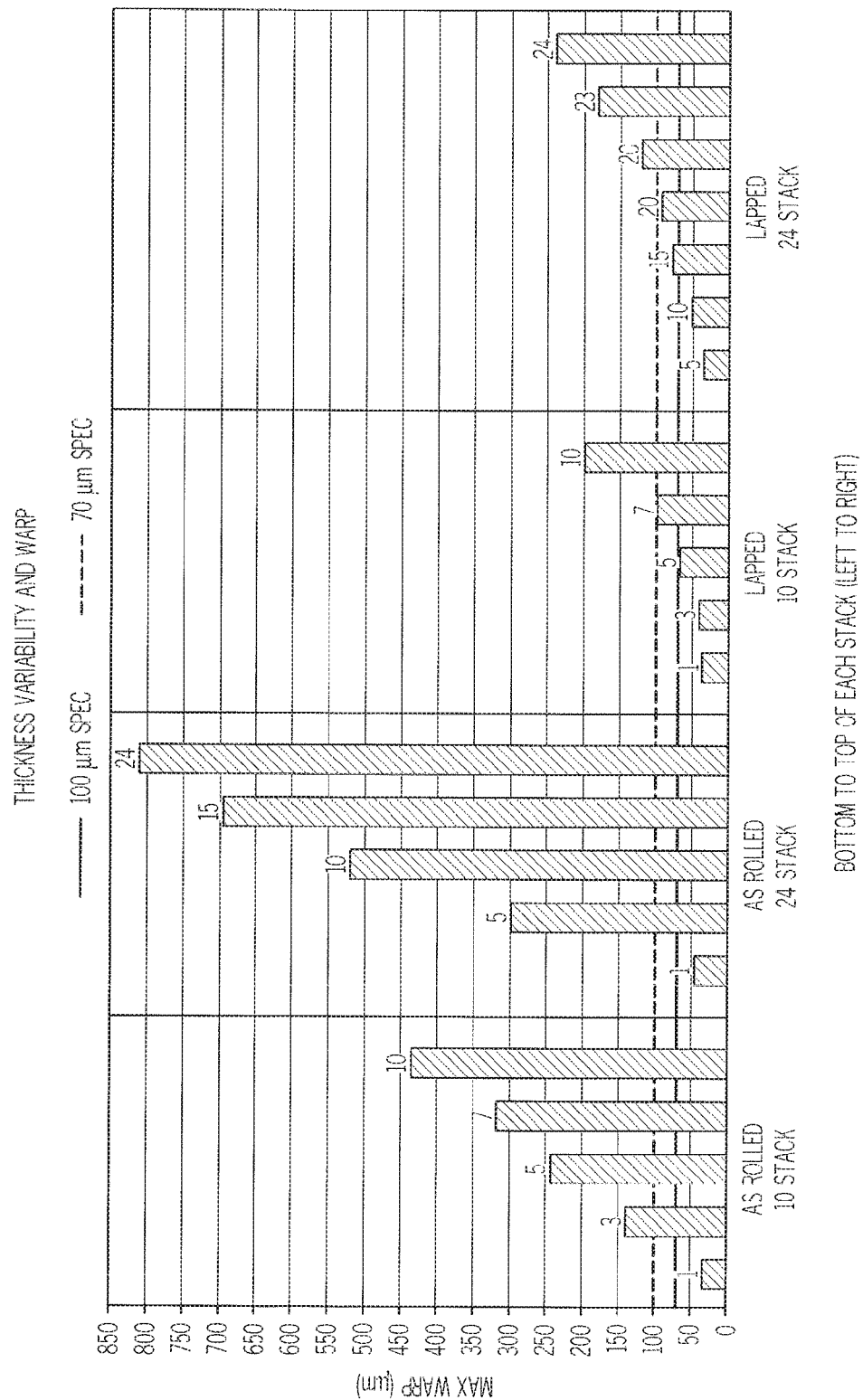
FIG. 23 is a graph illustrating the maximum warp (μm; y-axis) through the thickness of glass stacks having various thickness variability in accordance with one or more embodiments described herein.
Figure 24:
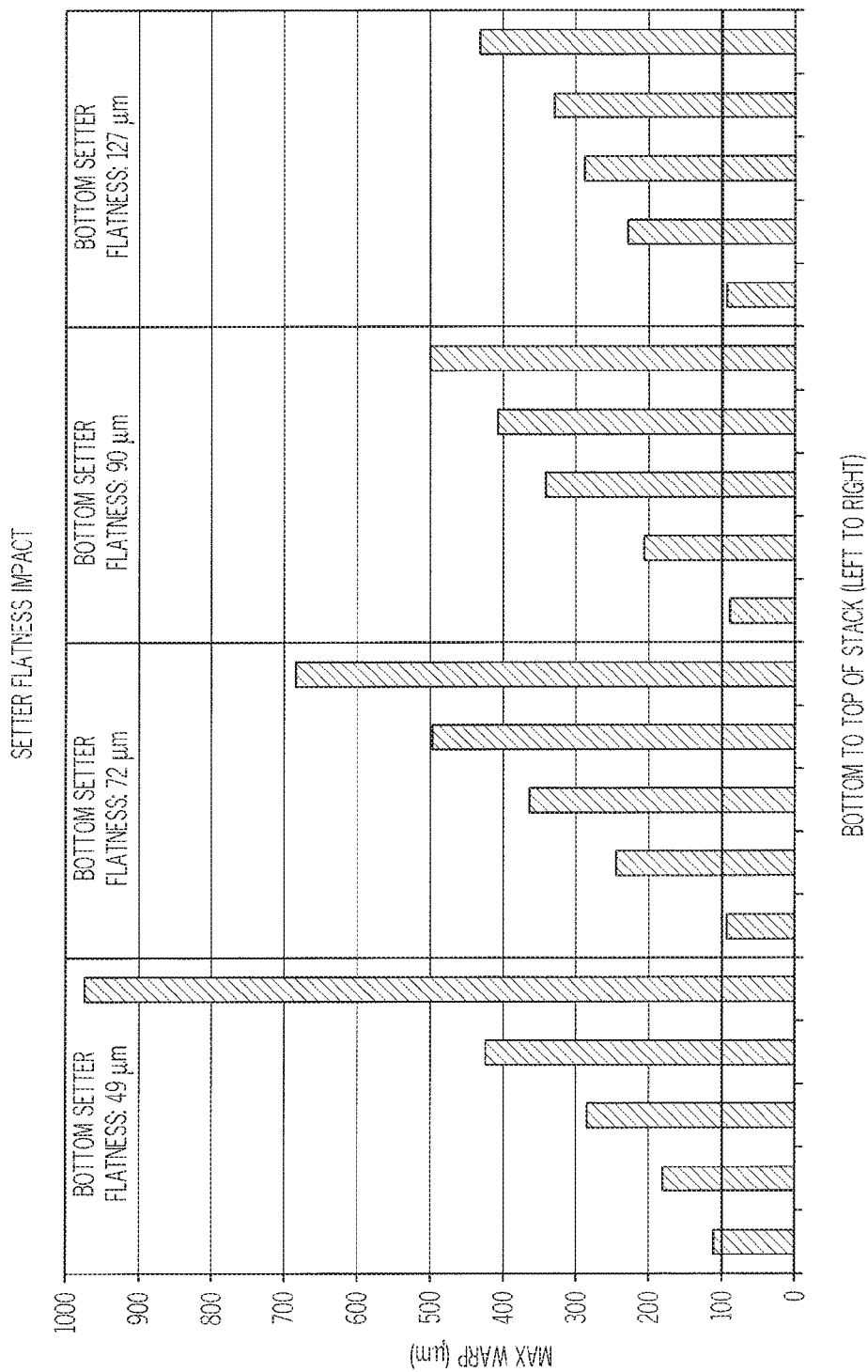
FIG. 24 is a graph illustrating the maximum warp (μm; y-axis) through the thickness of the glass stack for various setter plate flatnesses in accordance with one or more embodiments described herein.

According to various embodiments herein, the thickness uniformity of the glass sheets 108 is controlled to decrease the warp of the glass ceramic article. In FIG. 23, the maximum warp for glass stacks of 10 glass sheets and 24 glass sheets for both as-rolled glass and lapped glass is shown. As shown in FIG. 23, for glass stacks including as-rolled glass sheets with a maximum thickness variation of 64 µm, the maximum warp was significantly increased as compared to glass stacks including lapped glass sheets with a maximum thickness variation of 21 µm. Additionally, as demonstrated by the data in FIG. 24, the flatness of the setter plate 104 (as described above) has an impact that is limited by the variability of the thickness of the glass sheets. In particular, FIG. 24 shows that for a 10-glass sheet stack configuration of as-rolled glass, a 78 µm reduction in the flatness of the setter plate has a limited impact on the warp of the glass ceramic article. Accordingly, following sheet formation, in various embodiments, the glass sheets may be machined or otherwise processed to reduce the thickness variability of the glass sheets.

Figure 25A:
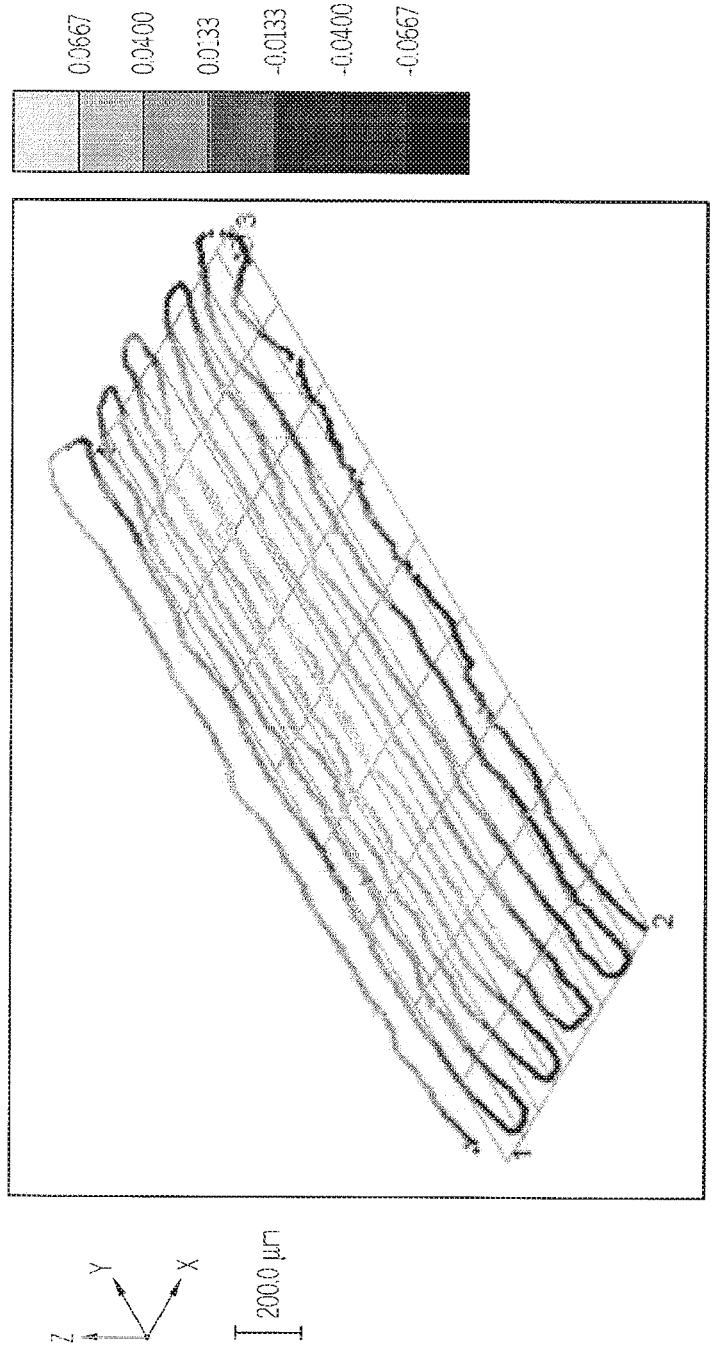
FIG. 25A is a graphical representation of the warp of a 26 5-mm glass strip with the edge bead removed in accordance with one or more embodiments described herein.
Figure 25B:
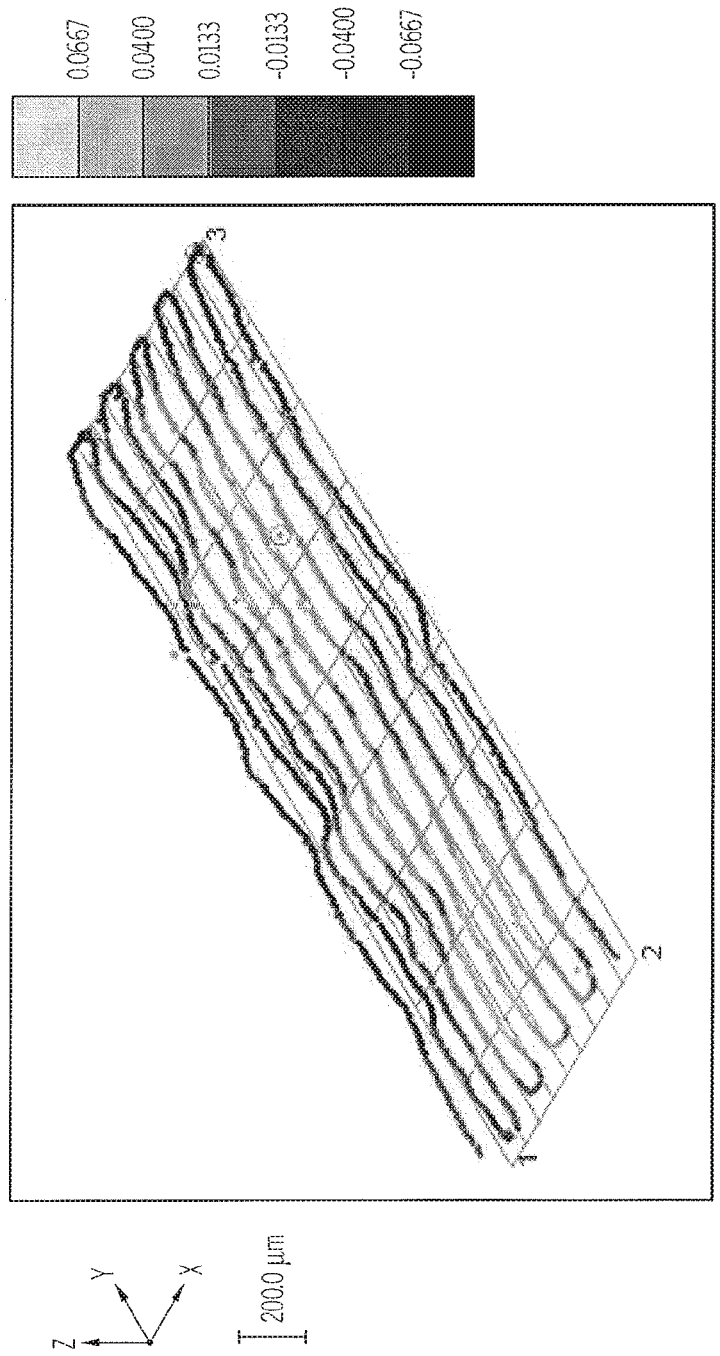
FIG. 25B is a graphical representation of the warp of a 26 5-mm glass strip with the edge bead remaining in accordance with one or more embodiments described herein.
Figure 26:
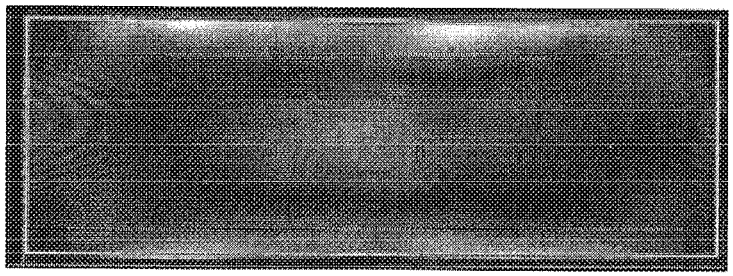
FIG. 26 is a graphical representation of the stress of a glass ceramic article with the edge bead remaining (top) and with the edge bead removed (bottom) in accordance with one or more embodiments described herein.
Figure 26:
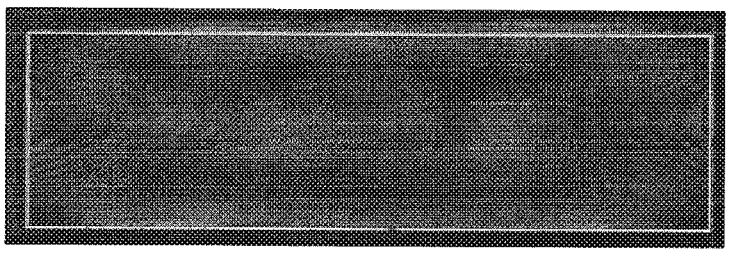
Figure 26:
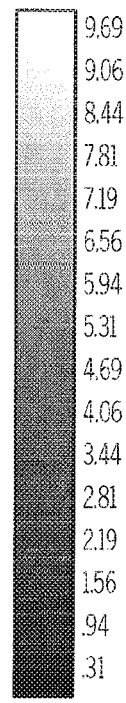

In various embodiments, the edge bead may be removed from glass sheets to decrease the amount of warp observed in the glass ceramic article. It is believed that the edge beads have higher thickness non-uniformity and therefore contribute to warp during the ceramming process. In particular, in embodiments in which a single sheet of glass is subjected to the ceramming process (e.g., not incorporated into a glass stack), the removal of the edge bead can reduce warp in the glass sheet. As shown in FIG. 25A, the removal of the edge bead (approximately 10 mm on each side of the glass sheet) decreases the maximum flatness by 56 µm as compared to the glass sheet without removal of the edge bead (FIG. 25B). Additionally, as shown in FIG. 26, the stress in the glass ceramic article is reduced when the bead is removed (bottom) as compared to when the glass ceramic article is cerammed including the bead (top). However, unexpectedly, removal of the edge bead from glass sheets incorporated into a glass stack during the ceramming process results in increased warp in embodiments in which a parting agent layer is not also incorporated into the glass stack. Without being bound by theory, it is believed that the increase in surface area contact resulting from the removal of the edge beads of adjacent glass sheets provides additional area for sticking to occur. Accordingly, in embodiments in which the edge bead is removed and the glass sheet is to be incorporated into a glass stack, a parting agent layer is incorporated.

Figure 27:
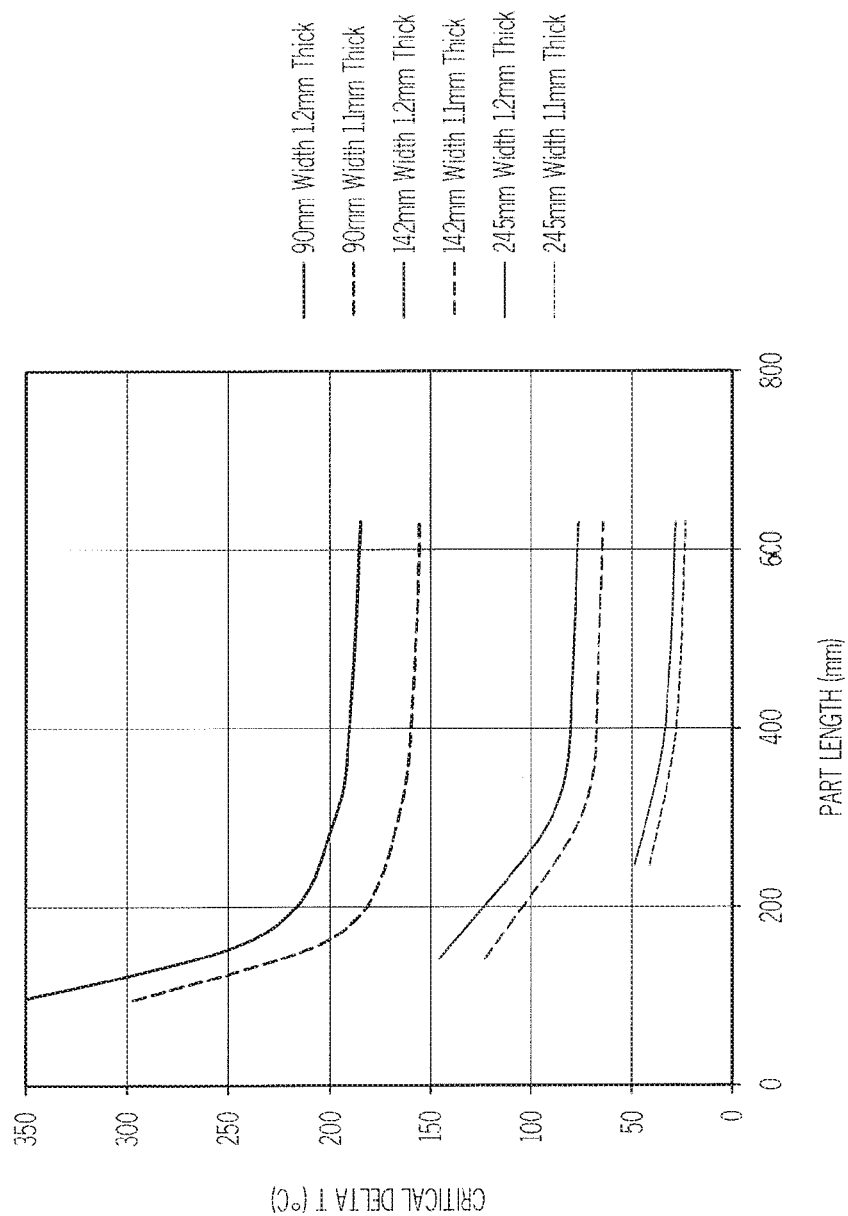
FIG. 27 is a graph plotting the critical delta T (° C.; y-axis) as a function of part length (mm; x-axis) for glass ceramic parts of various lengths and widths in accordance with one or more embodiments described herein.

In various embodiments, part size is also taken into account to control warp and stress in the glass ceramic article. As shown in FIG. 27, the critical ΔT decreases with part size. In particular, the critical ΔT is the ΔT at which stress and warp may be induced for various part lengths and widths. Accordingly, for larger parts, a larger ΔT may be acceptable without inducing warp or buckling into the final glass ceramic article.

Accordingly, in various embodiments, the thickness variation of the glass sheets can be controlled individually and throughout the glass stack, such as by edge bead removal and lapping, to reduce the warp and stress imparted to the glass ceramic article.

Composition of Glass or Glass Ceramic Precursors

The glass sheets 108 may be made from any glass composition that is suitable for forming glass ceramic articles, although it should be understood that the glass composition of the glass sheets 108 can impact the mechanical and optical properties of the glass ceramic article. In various embodiments, the glass composition is selected such that the resultant glass ceramic article has a petalite crystalline phase and a lithium silicate crystalline phase and wherein the petalite crystalline phase and the lithium silicate crystalline phase have higher weight percentages than other crystalline phases present in the glass ceramic article.

By way of example and not limitation, in various embodiments, the glass sheets 108 may be formed from a glass composition including from about 55 wt % to about 80 wt % $SiO_2$, from about 0 wt % to about 20 wt % $Al_2O_3$, from about 5 wt % to about 20 wt % $Li_2O$, from about 0 wt % to about 10 wt % $B_2O_3$, from about 0 wt % to about 5 wt % $Na_2O$, from about 0 wt % to about 10 wt % ZnO, from about 0.5 wt % to about 6 wt % $P_2O_5$, and from about 0.2 wt % to about 15 wt % $ZrO_2$. In embodiments, the glass or glass ceramic precursors may comprise alkali salts, such as $K_2O$, $Rb_2O$, or $Cs_2O$.

$SiO_2$, an oxide involved in the formation of glass, can function to stabilize the networking structure of glasses and glass-ceramics. In various glass compositions, the concentration of $SiO_2$ should be sufficiently high in order to form petalite crystal phase when the glass sheet is heat treated to convert to a glass-ceramic. The amount of $SiO_2$ may be limited to control the melting temperature of the glass, as the melting temperature of pure $SiO_2$ or high-$SiO_2$ glasses is undesirably high. In some embodiments, the glass or glass-ceramic composition comprises from about 55 wt % to about 80 wt % $SiO_2$. In some embodiments, the glass or glass-ceramic composition comprises from about 69 wt % to about 80 wt % $SiO_2$. In some embodiments, the glass or glass-ceramic composition can comprise from about 55 wt % to about 80 wt %, about 55 wt % to about 77 wt %, about 55 wt % to about 75 wt %, about 55 wt % to about 73 wt %, about 60 wt % to about 80 wt %, about 60 wt % to about 77 wt %, about 60 wt % to about 75 wt %, about 60 wt % to about 73 wt %, about 69 wt % to about 80 wt %, about 69 wt % to about 77 wt %, about 69 wt % to about 75 wt %, about 69 wt % to about 73 wt %, about 70 wt % to about 80 wt %, about 70 wt % to about 77 wt %, about 70 wt % to about 75 wt %, about 70 wt % to about 73 wt %, about 73 wt % to about 80 wt %, about 73 wt % to about 77 wt %, about 73 wt % to about 75 wt %, about 75 wt % to about 80 wt %, about 75 wt % to about 77 wt %, or about 77 wt % to about 80 wt % $SiO_2$.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass-ceramic composition can comprise from about 0 wt % to about 20 wt % $Al_2O_3$. In some embodiments, the glass or glass-ceramic composition can comprise from about 6 wt % to about 9 wt % $Al_2O_3$. In some embodiments, the glass or glass-ceramic composition can comprise from about 2 wt % to about 20 wt %, about 2 wt % to about 18 wt %, about 2 wt % to about 15 wt %, about 2 wt % to about 12 wt %, about 2 wt % to about 10 wt %, about 2 wt % to about 9 wt %, about 2 wt % to about 8 wt %, about 2 wt % to about 5 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 9 wt %, about 5 wt % to about 8 wt %, 6 wt % to about 20 wt %, about 6 wt % to about 18 wt %, about 6 wt % to about 15 wt %, about 6 wt % to about 12 wt %, about 6 wt % to about 10 wt %, about 6 wt % to about 9 wt %, 8 wt % to about 20 wt %, about 8 wt % to about 18 wt %, about 8 wt % to about 15 wt %, about 8 wt % to about 12 wt %, about 8 wt % to about 10 wt %, 10 wt % to about 20 wt %, about 10 wt % to about 18 wt %, about 10 wt % to about 15 wt %, about 10 wt % to about 12 wt %, about 12 wt % to about 20 wt %, about 12 wt % to about 18 wt %, or about 12 wt % to about 15 wt % $Al_2O_3$.

In the glass and glass-ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high (greater than about 15 wt %), the composition becomes very fluid. Accordingly, in some embodiments, the glass or glass-ceramic composition can comprise from about 5 wt % to about 20 wt % $Li_2O$. In other embodiments, the glass or glass-ceramic composition can comprise from about 10 wt % to about 14 wt % $Li_2O$. In some embodiments, the glass or glass-ceramic composition can comprise from about 5 wt % to about 20 wt %, about 5 wt % to about 18 wt %, about 5 wt % to about 16 wt %, about 5 wt % to about 14 wt %, about 5 wt % to about 12 wt %, about 5 wt % to about 10 wt %, about 5 wt % to about 8 wt %, about 7 wt % to about 20 wt %, about 7 wt % to about 18 wt %, about 7 wt % to about 16 wt %, about 7 wt % to about 14 wt %, about 7 wt % to about 12 wt %, about 7 wt % to about 10 wt %, about 10 wt % to about 20 wt %, about 10 wt % to about 18 wt %, about 10 wt % to about 16 wt %, about 10 wt % to about 14 wt %, about 10 wt % to about 12 wt %, about 12 wt % to about 20 wt %, about 12 wt % to about 18 wt %, about 12 wt % to about 16 wt %, about 12 wt % to about 14 wt %, about 14 wt % to about 20 wt %, about 14 wt % to about 18 wt %, about 14 wt % to about 16 wt %, about 16 wt % to about 20 wt %, about 16 wt % to about 18 wt %, or about 18 wt % to about 20 wt % $Li_2O$.

As noted above, $Li_2O$ is generally useful for forming various glass-ceramics, but the other alkali oxides tend to decrease glass-ceramic formation and form an aluminosilicate residual glass in the glass-ceramic. It has been found that more than about 5 wt % $Na_2O$ or $K_2O$, or combinations thereof, leads to an undesirable amount of residual glass, which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the glass sheets may be made from glass compositions having low amounts of non-lithium alkali oxides. In some embodiments, the glass or glass-ceramic composition can comprise from about 0 wt % to about 5 wt % $R_2O$, wherein R is one or more of the alkali cations Na and K. In some embodiments, the glass or glass-ceramic composition can comprise from about 1 wt % to about 3 wt % $R_2O$, wherein R is one or more of the alkali cations Na and K. In some embodiments, the glass or glass-ceramic composition can comprise from 0 wt % to about 5 wt %, 0 wt % to about 4 wt %, 0 wt % to about 3 wt %, 0 wt % to about 2 wt %, 0 wt % to about 1 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt % $Na_2O$, $K_2O$, or combinations thereof.

The glass and glass-ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body. However, if the concentration of $P_2O_5$ is too high, the devitrification, upon cooling during the formation of the glass sheets, can be difficult to control. Embodiments can include from >0 wt % to about 6 wt % $P_2O_5$. Other embodiments can include from about 2 wt % to about 4 wt % $P_2O_5$. Still other embodiments can include from about 1.5 wt % to about 2.5 wt % $P_2O_5$. In some embodiments, the glass or glass-ceramic composition can include from 0 wt % to about 6 wt %, 0 wt % to about 5.5 wt %, 0 wt % to 5 wt %, 0 wt % to about 4.5 wt %, 0 wt % to about 4 wt %, 0 wt % to about 3.5 wt %, 0 wt % to about 3 wt %, 0 wt % to about 2.5 wt %, 0 wt % to about 2 wt %, 0 wt % to about 1.5 wt %, 0 wt % to about 1 wt %, >0 wt % to about 6 wt %, >0 wt % to about 5.5 wt %, >0 wt % to 5 wt %, >0 wt % to about 4.5 wt %, >0 wt % to about 4 wt %, >0 wt % to about 3.5 wt %, >0 wt % to about 3 wt %, >0 wt % to about >2.5 wt %, 0 wt % to about 2 wt %, >0 wt % to about 1.5 wt %, >0 wt % to about 1 wt %, about 0.5 wt % to about 6 wt %, about 0.5 wt % to about 5.5 wt %, about 0.5 wt % to 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to 5 wt %, about 3.5 wt % to about 4.5 wt %, about 3.5 wt % to about 4 wt %, about 4 wt % to about 6 wt %, about 4 wt % to about 5.5 wt %, about 4 wt % to 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, or about 5.5 wt % to about 6 wt % $P_2O_5$.

In various glass and glass-ceramic compositions, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass or glass-ceramic composition can comprise from about 0.2 wt % to about 15 wt % $ZrO_2$. In some embodiments, the glass or glass-ceramic composition can include from about 2 wt % to about 4 wt % $ZrO_2$. In some embodiments, the glass or glass-ceramic composition can comprise from about 0.2 wt % to about 15 wt %, about 0.2 wt % to about 12 wt %, about 0.2 wt % to about 10 wt %, about 0.2 wt % to about 8 wt %, about 0.2 wt % to about 6 wt %, about 0.2 wt % to about 4 wt %, about 0.5 wt % to about 15 wt %, about 0.5 wt % to about 12 wt %, about 0.5 wt % to about 10 wt %, about 0.5 wt % to about 8 wt %, about 0.5 wt % to about 6 wt %, about 0.5 wt % to about 4 wt %, about 1 wt % to about 15 wt %, about 1 wt % to about 12 wt %, about 1 wt % to about 10 wt %, about 1 wt % to about 8 wt %, about 1 wt % to about 6 wt %, about 1 wt % to about 4 wt %, about 2 wt % to about 15 wt %, about 2 wt % to about 12 wt %, about 2 wt % to about 10 wt %, about 2 wt % to about 8 wt %, about 2 wt % to about 6 wt %, about 2 wt % to about 4 wt %, about 3 wt % to about 15 wt %, about 3 wt % to about 12 wt %, about 3 wt % to about 10 wt %, about 3 wt % to about 8 wt %, about 3 wt % to about 6 wt %, about 3 wt % to about 4 wt %, about 4 wt % to about 15 wt %, about 4 wt % to about 12 wt %, about 4 wt % to about 10 wt %, about 4 wt % to about 8 wt %, about 4 wt % to about 6 wt %, about 8 wt % to about 15 wt %, about 8 wt % to about 12 wt %, about 8 wt % to about 10 wt %, about 10 wt % to about 15 wt %, about 10 wt % to about 12 wt %, or about 12 wt % to about 15 wt % $ZrO_2$.

$B_2O_3$ is conducive to providing a glass sheet with a low melting temperature. Furthermore, the addition of $B_2O_3$ in the glass sheet and thus the glass-ceramic article helps achieve an interlocking crystal microstructure and can also improve the damage resistance of the glass-ceramic article. When boron in the residual glass is not charge balanced by alkali oxides or divalent cation oxides, it will be in trigonal-coordination state (or three-coordinated boron), which opens up the structure of the glass. The network around these three coordinated boron is not as rigid as tetrahedrally coordinated (or four-coordinated) boron. Without being bound by theory, it is believed that glass sheets and glass-ceramics that include three-coordinated boron can tolerate some degree of deformation before crack formation. By tolerating some deformation, the Vickers indentation crack initiation values are increased. Fracture toughness of the glass sheets and glass-ceramics that include three-coordinated boron may also be increased. Without being bound by theory, it is believed that the presence of boron in the residual glass of the glass-ceramic (and glass sheet) lowers the viscosity of the residual glass (or glass sheet), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack imitation load. In some embodiments, the amount of three-coordinated boron (as a percent of total $B_2O_3$) may be about 40% or greater, 50% or greater, 75% or greater, 85% or greater, or even 95% or greater. The amount of boron in general should be controlled to maintain chemical durability and mechanical strength of the cerammed bulk glass-ceramic.

In one or more embodiments, the glass or glass-ceramic composition comprises from 0 wt % to about 10 wt % or from 0 wt % to about 2 wt % $B_2O_3$. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, >0 wt % to about 10 wt %, >0 wt % to about 9 wt %, >0 wt % to about 8 wt %, >0 wt % to about 7 wt %, >0 wt % to about 6 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 2 wt %, about 2 wt % to about 10 wt %, about 2 wt % to about 8 wt %, about 2 wt % to about 6 wt %, about 2 wt % to about 4 wt %, about 3 wt % to about 10 wt %, about 3 wt % to about 8 wt %, about 3 wt % to about 6 wt %, about 3 wt % to about 4 wt %, about 4 wt % to about 5 wt %, about 5 wt % to about 8 wt %, about 5 wt % to about 7.5 wt %, about 5 wt % to about 6 wt %, or about 5 wt % to about 5.5 wt % $B_2O_3$.

MgO can enter petalite crystals in a partial solid solution. In one or more embodiments, the glass or glass-ceramic composition can comprise from 0 wt % to about 8 wt % MgO. In some embodiments, the glass or glass-ceramic composition can comprise from 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 8 wt %, about 4 wt % to about 7 wt %, about 4 wt % to about 6 wt %, about 4 wt % to about 5 wt %, about 5 wt % to about 8 wt %, about 5 wt % to about 7 wt %, about 5 wt % to about 6 wt %, about 6 wt % to about 8 wt %, about 6 wt % to about 7 wt %, or about 7 wt % to about 8 wt % MgO.

ZnO can enter petalite crystals in a partial solid solution. In one or more embodiments, the glass or glass-ceramic composition can comprise from 0 wt % to about 10 wt % ZnO. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, or about 9 wt % to about 10 wt % ZnO.

In various embodiments, the glass or glass-ceramic composition may further include one or more constituents, such as, by way of example and not limitation, $TiO_2$, $CeO_2$, and $SnO_2$. Additionally or alternatively, antimicrobial components may be added to the glass or glass-ceramic composition. Antimicrobial components that may be added to the glass or glass-ceramic may include, but are not limited to, Ag, AgO, Cu, CuO, $Cu_2O$, and the like. In some embodiments, the glass or glass-ceramic composition may further include a chemical fining agent. Such fining agents include, but are not limited to, $SnO_2$, $As_2O_3$, $Sb_2O_3$, F, Cl, and Br. Additional details on glass and/or glass-ceramic compositions suitable for use in various embodiments may be found in, for example, U.S. Patent Application Publication No. 2016/0102010 entitled "High Strength Glass-Ceramics Having Petalite and Lithium Silicate Structures," filed Oct. 8, 2015, which is incorporated by reference herein in its entirety.

Heating Conditions For Forming Glass Ceramic Articles

In one or more embodiments, the processes for making glass-ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment may include (i) heating precursor glasses at a rate of 0.01-50° C./min to a nucleation temperature (Tn); (ii) maintaining the crystallizable glasses at the nucleation temperature for first predetermined period of time ($t_N$) to produce a nucleated crystallizable glass compositions; (iii) heating the nucleated crystallizable glasses at a rate in the range from about 0.01° C./min to about 50 ° C./min to a crystallization temperature (Tc); (iv) maintaining the nucleated crystallizable glasses at the crystallization temperature for a second predetermined period of time ($t_C$) to produce the glass-ceramic articles described herein; and (v) cooling the formed glass-ceramic to room temperature. The terms "ceram" or "ceramming", in the preceding embodiments, may be used to refer to steps (iii), (iv) and optionally (v), collectively. In some embodiments, the nucleation temperature can be in a range from 500° C. to 650° C. (for example, 500° C., 510° C., 520° C., 530° C., 540° C., 550° C., 560° C., 570° C., 580° C., 590° C., 600° C., 610° C., 620° C., 630° C., 640° C., or 650° C.) and all ranges and subranges there between; and/or the crystallization temperature can be in a range from 680° C. to 800° C. (for example, 680° C., 690° C., 700° C., 710° C., 720° C., 730° C., 740° C., 750° C., 760° C., 770° C., 780° C., 790° C., or 800° C.) and all ranges and subranges there between. In some embodiments, the first predetermined time for maintaining the nucleation temperature can be in a range from 1 minute to 6 hours (for example 1 minute, 5 minutes, 10 minutes, 20 minutes, 30 minutes, 40 minutes, 50 minutes, 1 hour, 1.5 hours, 2 hours, 2.5 hours, 3 hours, 3.5 hours, 4 hours, 4.5 hours, 5 hours, 5.5 hours, or 6 hours) and all ranges and subranges there between. In some embodiments, the second predetermined time for maintaining the crystallization temperature can be in a range from 1 minute to 4 hours (for example 1 minute, 5 minutes, 10 minutes, 20 minutes, 30 minutes, 40 minutes, 50 minutes, 1 hour, 1.5 hours, 2 hours, 2.5 hours, 3 hours, 3.5 hours, or 4 hours) and all ranges and subranges there between. In some embodiments, the crystallization temperature depends on whether a transparent or translucent/opaque glass-ceramic is desired. In some embodiments, a crystallization temperature of about 750° C. or below will result in a transparent glass-ceramic and a crystallization temperature above about 750° C. will result in a translucent/opaque glass-ceramic. In some embodiments, the glass can be heated from room temperature to a nucleation temperature of 570° C. at a rate of 5° C./min, maintained at the nucleation temperature for 4 hours, then heated to the crystallization temperature of 740° C. at a rate of 5° C./min, and maintained at the crystallization temperature for 1 hour.

In some embodiments, there may be one of more additional temperature holds between the nucleation temperature and the crystallization temperature. Thus, in some embodiments, after maintaining the article at the nucleation temperature, the article may be heated to one or more intermediate temperatures (wherein the intermediate temperatures are in a range between the nucleation temperature and the crystallization temperature) and held at the one or more intermediate temperatures for a predetermined time (for example, between 1 hour and 4 hours and all ranges and subranges there between) and then heated to the crystallization temperature. Example 5 below demonstrates exemplary 3-step heat treatment cycles with an intermediate temperature hold.

In some embodiments, once the composition is heated to the nucleation temperature, the composition is not maintained at the nucleation temperature but instead is continuously heated to one or more intermediate temperatures until the crystallization temperature is reached (i.e., the temperature is not maintained at any of the intermediate temperatures or the nucleation temperature). In some embodiments, the heating rate from room temperature to the nucleation temperature, the heating rate from the nucleation temperature to the intermediate temperature, the heating rate from the intermediate temperature to the crystallization temperature vary. In embodiments where there are multiple intermediate temperatures, the heating rate between the individual intermediate temperatures may also vary. Example 6 below demonstrates such exemplary heat treatment schedules. In some embodiments, the heating rates may vary and may be in a range from about 0.01° C./min to about 50° C./min, about 0.01° C./min, about 0.1° C./min, about 0.5° C./min, about 1° C./min, about 2° C./min, about 3° C./min, about 4° C./min, about 5° C./min, about 10° C./min, about 15° C./min, about 20° C./min, about 25° C./min, about 30° C./min, about 40° C./min, about 45° C./min, about 50° C./min, and all ranges and subranges there between. In some embodiments, the heating rate may increase from one heating rate to another heating rate. In other embodiments, the heating rate may decrease from one heating rate to another heating rate.

In some embodiments, the glass-ceramic article is cooled after being held at the crystallization temperature. In some embodiments, the glass-ceramic article may be cool to room temperature in a single stage at a constant cooling rate, in two stages each with a different cooling rate, or in three or more stages each with a different cooling rate. In some embodiments, the glass-ceramic articles are cooled at a controlled rate from the crystallization temperature in order to minimize temperature gradients across the articles as well as minimize residual stress across the articles. Temperature gradients and differences in residual stress may lead to the articles warping during cooling. Thus, controlling the cooling to control the temperature gradients and residuals stresses may also minimize warpage of the glass-ceramic articles.

Figure 28:
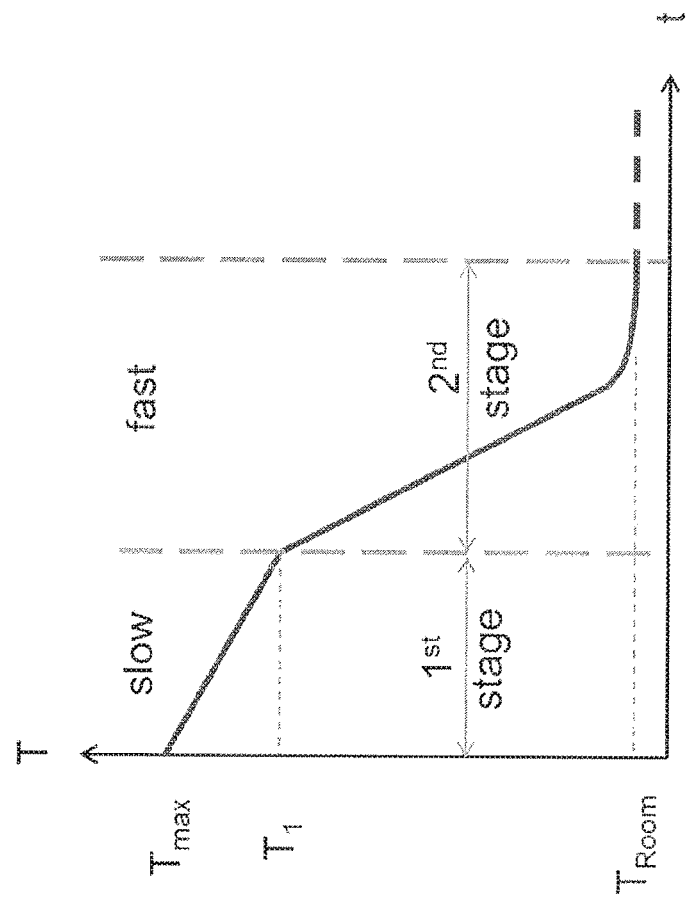
FIG. 28 is an exemplary diagram of a cooling cycle according to embodiments disclosed and described herein.

In some embodiments, as shown for example in FIG. 28, cooling may occur in two cooling stages. In such embodiments, in the first cooling stage, the temperature cools from $T_{max}$ (i.e., $T_C$—the crystallization temperature) to $T_1$ at a first cooling rate. In the second cooling stage, the temperature cools from $T_1$ to about room temperature ($T_{Room}$) at a second cooling rate. As shown in FIG. 28, the first cooling rate is slower than the second cooling rate. The first cooling rate during the first stage is slow to minimize the temperature gradient across the glass-ceramic article. In some embodiments, the temperature $T_1$ where the transition from the first cooling stage to the second cooling stage occurs is determined based on the temperature below which the glass-ceramic article behaves as an elastic material. Without be bound by theory, it is believed that the slower cooling rate of the first cooling stage is only needed to control the temperature gradients until the glass-ceramic article reaches the temperature below which it behaves as an elastic material. In some embodiments, temperature $T_1$ may be in a range from 450° C. to 550° C. and all ranges and subranges there between. In some embodiments, temperature Ti may be less than or equal to 550° C., 540° C., 530° C., 520° C., 510 ° C., 500° C., 490° C., 480° C., 470° C., 460° C., or 450° C. In some embodiments, the temperature drop in the first cooling stage ($T_{max}$-$T_1$) is less than the temperature drop in the second cooling stage ($T_1$-$T_{Room}$). Without be bound by theory, it is believed that temperature gradients that develop in the first cooling stage have a greater effect on the residual stresses (and therefore warp) in the glass-ceramic article upon reaching room temperature (in the form of optical retardance) than temperature gradients that develop in the second cooling stage. Thus, in some embodiments, after controlled cooling in the first cooling stage, the glass-ceramic article may be allowed to cool to room temperature in an uncontrolled cooling environment.

Figure 29:
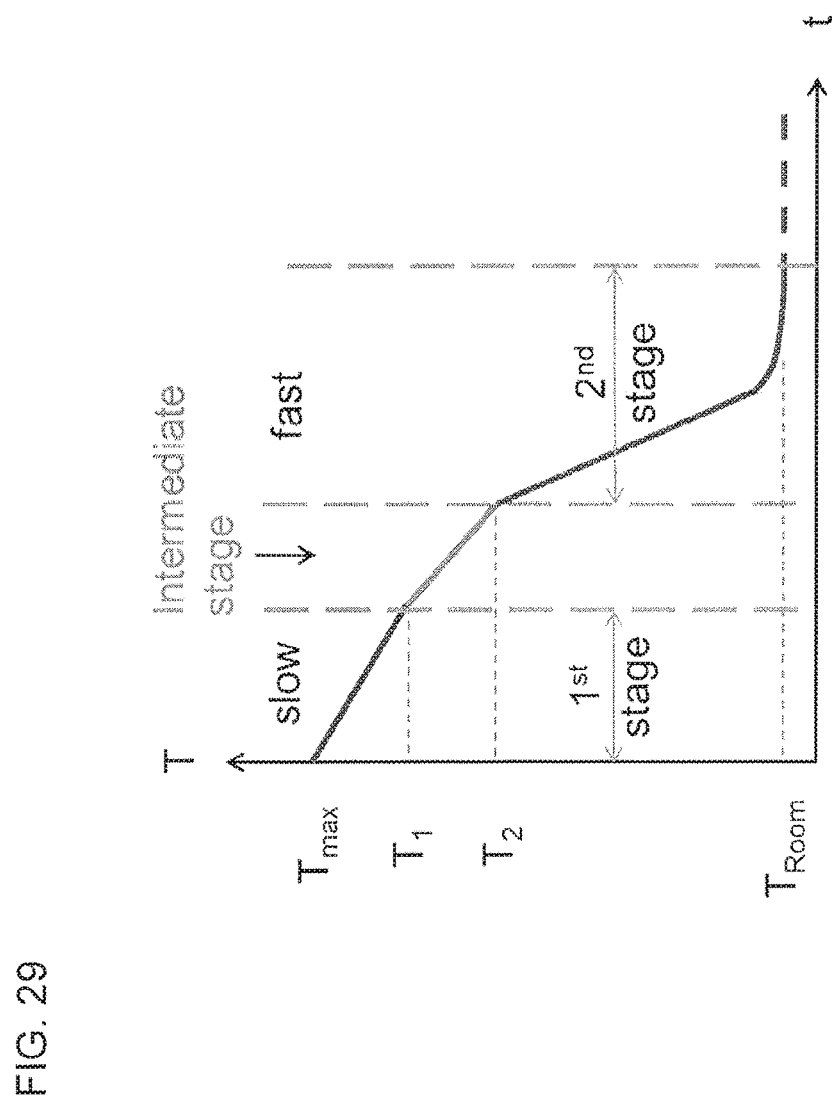
FIG. 29 is an exemplary diagram of another cooling cycle according to embodiments disclosed and described herein.

In some embodiments, as shown for example in FIG. 29, the cooling cycle may have an intermediate cooling stage in between the first cooling stage and the second cooling stage for a total of three cooling stages. In such embodiments, in the first cooling stage, the temperature cools from $T_{max}$ (i.e., $T_C$—the crystallization temperature) to $T_1$ at a first cooling rate. In the intermediate cooling stage, the temperature cools from $T_1$ to $T_2$ at a second cooling rate. In the second stage, the temperature cools from $T_2$ to about room temperature ($T_{Room}$) at a third cooling rate. As shown in FIG. 29, the cooling rate increases with each stage such that (i) the first cooling rate during the first cooling stage is less than the second cooling rate during the intermediate cooling stage and the third cooling rate during the second cooling stage and (ii) the second cooling rate during the intermediate cooling stage is less than the third cooling rate during the second cooling stage. In some embodiments, (i) the temperature drop in the first cooling stage ($T_{max}$-$T_1$) is less than the temperature drop in the intermediate cooling stage ($T_1$-$T_2$) and the temperature drop in the second cooling stage ($T_2$-$T_{Room}$) and (ii) the temperature drop in the intermediate cooling stage ($T_1$-$T_2$) is less than the temperature drop in the second cooling stage ($T_2$-$T_{Room}$). The intermediate cooling stages allows for a faster cooling cycle while still minimizing temperature gradients and residual stress. In some embodiments, $T_{max}$ may be about 740° C., $T_1$ may be about 640° C., and $T_2$ may be about 580° C.

In some embodiments, when having multiple cooling stages in the cooling cycle, the temperature gradients across the glass-ceramic article during the first cooling stage may be less than 15° C., less than 14° C., less than 13° C., less than 12° C., less than 11° C., less than 10° C., less than 9° C., less than 8° C., less than 7° C., less than 6° C., less than 5° C., less than 4° C., or less than 3° C. and/or the optical retardance at room temperature of the less than 15 nm/mm of thickness, less than 14 nm/mm of thickness, less than 13 nm/mm of thickness, less than 12 nm/mm of thickness, less than 11 nm/mm of thickness, less than 10 nm/mm of thickness, less than 9 nm/mm of thickness, less than 8 nm/mm of thickness, less than 7 nm/mm of thickness, less than 6 nm/mm of thickness, less than 5 nm/mm of thickness, less than 4 nm/mm of thickness, or less than 3 nm/mm of thickness. The optical retardation may be measured according to ASTM F218-13.

Upon performing the above heat treatments to the precursor glass, the resultant glass-ceramic has one or more crystalline phases and a residual glass phase. In some embodiments, the glass-ceramic contains the following exemplary crystalline phases: lithium disilicate, petalite, β-spodumene solid solution, β-quartz solid solution, lithium metasilicate, virgilite, cristobalite, lithium phosphate, baddeleyite and zirconia and any combinations thereof.

In some embodiments, lithium disilicate is the crystalline phase with the highest weight percentage. Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals. In some embodiments, the weight percentage of the lithium disilicate crystalline phase in the glass-ceramic compositions can be in a range from about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 60 wt %, about 35 to about 55 wt %, about 35 to about 50 wt %, about 35 to about 45 wt %, about 35 to about 40 wt %, about 40 to about 60 wt %, about 40 to about 55 wt %, about 40 to about 50 wt %, about 40 to about 45 wt %, about 45 to about 60 wt %, about 45 to about 55 wt %, about 45 to about 50 wt %, about 50 to about 60 wt %, about 50 to about 55 wt %, or about 55 to about 60 wt %. In some embodiments, the glass-ceramic has 20, 21, 22, 23, 24, 25, 26, 27, 28, 29, 30, 31, 32, 33, 34, 35, 36, 37, 38 ,39, 40, 41, 42, 43, 44, 45, 46, 47, 48, 49, 50, 51, 52, 53, 54, 55, 56, 57, 58, 59, or 60 wt % lithium disilicate crystalline phase.

In some embodiments, petalite is the crystalline phase with the highest weight percentage. Petalite, $LiAlSi_4O_{10}$, is a monoclinic crystal possessing a three-dimensional framework structure with a layered structure having folded $Si_2O_5$ layers linked by Li and Al tetrahedral. The Li is in tetrahedral coordination with oxygen. The mineral petalite is a lithium source and is used as a low thermal expansion phase to improve the thermal downshock resistance of glass-ceramic or ceramic parts. Moreover, glass-ceramic articles based on the petalite phase can be chemically strengthened in a salt bath, during which $Na^+$ (and/or $K^+$) replaces $Li^+$ in the petalite structure, which causes surface compression and strengthening. In some embodiments, the weight percentage of the petalite crystalline phase in the glass-ceramic compositions can be in a range from about 20 to about 70 wt %, about 20 to about 65 wt %, about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 70 wt %, about 25 to about 65 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 70 wt %, about 30 to about 65 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 70 wt %, about 35 to about 65 wt %, about 35 to about 60 wt %, about 35 to about 55 wt %, about 35 to about 50 wt %, about 35 to about 45 wt %, about 35 to about 40 wt %, about 40 to about 70 wt %, about 40 to about 65 wt %, about 40 to about 60 wt %, about 40 to about 55 wt %, about 40 to about 50 wt %, about 40 to about 45 wt %, about 45 to about 70 wt %, about 45 to about 65 wt %, about 45 to about 60 wt %, about 45 to about 55 wt %, about 45 to about 50 wt %, about 50 to about 70 wt %, about 50 to about 65 wt %, about 50 to about 60 wt %, about 50 to about 55 wt %, about 55 to about 70 wt %, about 55 to about 65 wt %, about 55 to about 60 wt %, about 60 to about 70 wt %, about 60 to about 65 wt %, or about 65 to about 70 wt %. In some embodiments, the glass-ceramic has about 20, 21, 22, 23, 24, 25, 26, 27, 28, 29,30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

Accordingly, in embodiments, the glass ceramics may comprise a combined weight percent of lithium disilicate and petalite crystalline phase that is greater than or equal to 40 wt %, such as greater than or equal to 42 wt %, greater than or equal to 44 wt %, greater than or equal to 46 wt %, greater than or equal to 48 wt %, greater than or equal to 50 wt %, greater than or equal to 52 wt %, greater than or equal to 54 wt %, greater than or equal to 56 wt %, greater than or equal to 58 wt %, greater than or equal to 60 wt %, greater than or equal to 62 wt %, greater than or equal to 64 wt %, greater than or equal to 66 wt %, greater than or equal to 68 wt %, greater than or equal to 70 wt %, greater than or equal to 72 wt %, greater than or equal to 74 wt %, greater than or equal to 76 wt %, greater than or equal to 78 wt %, greater than or equal to 80 wt %, greater than or equal to 82 wt %, greater than or equal to 84 wt %, or greater than or equal to 85 wt %. In some embodiments, the crystalline phases other than lithium disilicate and petalite have a total wt % in the glass-ceramic article of less than 5 wt %, less than 4 wt %, less than 3 wt %, less than 2 wt %, or less than 1 wt %.

In embodiments, the glass ceramic may comprise lithium phosphate as a third crystalline phase. In embodiments, at least 80% of the phosphate present in the glass ceramic is present as lithium phosphate, such as at least 85%, at least 90%, or at least 95%. The Raman peak height ratio of petalite to lithium phosphate is, in embodiments, from 1.1 to 1.3, and the Raman peak height ration of lithium disilicate to lithium phosphate is from 1.0 to 1.2.

In some embodiments, the glass-ceramic has a residual glass content of about 5 to about 30 wt %, about 5 to about 25 wt %, about 5 to about 20 wt %, about 5 to about 15 wt % about 5 to about 10 wt %, about 10 to about 50 wt %, about 10 to about 45 wt %, about 10 to about 40 wt %, about 10 to about 35 wt %, about 10 to about 30 wt %, about 10 to about 25 wt %, about 10 to about 20 wt %, about 10 to about 15 wt %, about 15 to about 50 wt %, about 15 to about 45 wt %, about 15 to about 40 wt %, about 15 to about 35 wt %, about 15 to about 30 wt %, about 15 to about 25 wt %, about 15 to about 20 wt %, about 20 to about 50 wt %, about 20 to about 45 wt %, about 20 to about 40 wt %, about 20 to about 35 wt %, about 20 to about 30 wt % about 20 to about 25 wt %, about 25 to about 30 wt %, and all ranges and subranges there between. In some embodiments the residual glass content can be less than or equal to 30, 25, 20, 19, 18, 17, 16, 15, 14, 13, 12, 11, 10, 9, 8, 7, 6, 5, 4, 3, 2, or 1 wt %.

In some embodiments, the glass-ceramic may have a weight percentage of crystals in a range from greater than 20 wt % to 100 wt %, greater than 20 wt % to 90 wt %, greater than 20 wt % to 80 wt %, greater than 20 wt % to 70 wt %, 30 wt % to 100 wt %, 30 wt % to 90 wt %, 30 wt % to 80 wt %, 30 wt % to 70 wt %, 40 wt % to 100 wt %, 40 wt % to 90 wt %, 40 wt % to 80 wt %, 40 wt % to 70 wt %, 50 wt % to 100 wt %, 50 wt % to 90 wt %, 50 wt % to 80 wt %, 50 wt % to 70 wt %, and all ranges and subranges there between. In some embodiments, the inner region may have a weight percentage of crystals greater than 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %.

The grain size of the crystals in the crystalline phases is a factor that affects the transparency of the glass-ceramic. In some embodiments, the grains have a longest dimension in a range from about 5 nm to about 150 nm, about 5 nm to about 125 nm, about 5 nm to about 100 nm, about 5 nm to about 75 nm, about 5 nm to about 50 nm, about 25 nm to about 150 nm, about 25 nm to about 125 nm, about 25 nm to about 100 nm, about 25 nm to about 75 nm, about 50 nm to about 150 nm, about 50 nm to about 125 nm, about 50 nm to about 100 nm, and all ranges and subranges there between. In some embodiments, the longest dimension of the grains is less than 150 nm, less than 125 nm, less than 100 nm, less than 75 nm, less than 50 nm, or less than 25 nm. The longest dimension of the grains is measured using a scanning electron microscope (SEM).

In some embodiments, the phase assemblage and heat treatment conditions are chosen to create a glass-ceramic article with suitable optical properties, such as transparency and low haze, for use as a cover glass for a mobile electronic device. In some embodiments, the glass-ceramic article is transparent in that it has an average transmittance of 85% or greater, 86% or greater, 87% or greater, 88% or greater, 89% or greater, 90% or greater, 91% or greater, 92% or greater, 93% or greater (including surface reflection losses) of light over the wavelength range from 450 nm to 600 nm for a glass-ceramic article having a thickness of 1 mm. In other embodiments, glass-ceramic may be translucent over the wavelength range from 450 nm to 600 nm. In some embodiments a translucent glass-ceramic can have an average transmittance in a range from about 20% to less than about 85% of light over the wavelength range of about 450 nm to about 800 nm for a glass-ceramic article having a thickness of 1 mm. In some embodiments, the glass-ceramic article has a haze of less than 0.2, 0.19, 0.18, 0.17, 0.16, 0.15, 0.14, 0.13, 0.12, 0.11, or 0.1.

Equation (2) below estimates the haze of a glass-ceramic article based on the nucleation temperature (TN), the nucleation hold time (tN), the crystallization temperature (TC), and the crystallization hold time (tC).

$$\text{Estimated haze} = 103 - 0.260 T_N 0.000203 (T_N)^2 - 7.96 t_N + 0.1532(t_N)^2 - 0.019 T_C - 0.0000008(T_C)^2 - 10.03 t_C + 0.00597 T_N * t_N + 0.00463 t_N * T_C + 0.01342 T_C * t_C \quad (2)$$

In some embodiments, the nucleation temperature (TN), the nucleation hold time (tN), the crystallization temperature (TC), and the crystallization hold time (tC) for the heat treatment cycle can be selected based on the estimated haze provide by Equation (2) to have an estimated haze of less than 0.2, 0.19, 0.18, 0.17, 0.16, 0.15, 0.14, 0.13, 0.12, 0.11, or 0.1. In some embodiments, the heat treatment may include (i) heating precursor glasses at a rate of 0.01-50° C./min to a nucleation temperature (Tn); (ii) maintaining the crystallizable glasses at the nucleation temperature for first predetermined period of time (tN) to produce a nucleated crystallizable glass compositions; (iii) heating the nucleated crystallizable glasses at a rate in the range from about 0.01° C./min to about 50° C./min to a crystallization temperature (Tc); (iv) maintaining the nucleated crystallizable glasses at the crystallization temperature for a second predetermined period of time ($t_C$) to produce the glass-ceramic articles described herein; and (v) cooling the formed glass-ceramic to room temperature, such that the value of Equation (2) is less than 0.2, 0.19, 0.18, 0.17, 0.16, 0.15, 0.14, 0.13, 0.12, 0.11, or 0.1.

Properties of Glass Ceramic Articles

In embodiments, the warp of the glass ceramic article may be measured as a function of the diagonal measurement of a glass ceramic article for which warp is to be determined. The diagonal is measured on a surface of the glass ceramic article having the greatest surface area. For example, if a glass ceramic article has an essentially rectangular shape (e.g., rectangular with rounded corners or the like), the diagonal referred to in the warp measurement will be measured as a diagonal of the essentially rectangular surface. As another example, if the glass article has a circular surface, the diagonal is the diameter of the circle. As a further example, if the glass article has an oval-shaped surface, the diagonal is the longest straight line that can be drawn from one point on the circumference of the oval-shaped surface to another point on the oval-shaped surface. Accordingly, in embodiments using the ceramming cycles, glass precursor compositions, setter configurations, and stack configurations disclosed and described herein, the glass ceramic articles formed may have a warp that meets the following:

$$\text{warp (µm)} < (3.65 \times 10^{-9} / \text{µm} \times \text{diagonal}^2)$$

It should be understood that the units for the warp value will be based on the units in which the diagonal is measured, such as µm.

Coinciding with the above measurement of warp based on the diagonal of the glass ceramic article, in embodiments, by using the ceramming cycles, glass precursor compositions, setter configurations, and stack configurations disclosed and described herein, the glass ceramic articles formed may have a warp measured on 156 mm×76 mm sheets of less than 110 µm, such as less than 105 µm, less than 100 µm, less than 95 µm, less than 90 µm, less than 85 µm, less than 80 µm, less than 75 µm, less than 70 µm, less than 65 µm, less than 60 µm, less than 55 µm, or less than 50 µm. In embodiments, the glass ceramic articles formed may have a warp on 156 mm×76 mm sheets from 45 µm to 100 pm, such as from 50 µm to 100 µm, from 55 µm to 100 µm, from 60 µm to 100 µm, from 65 µm to 100 µm, from 70 µm to 100 µm, from 75 µm to 100 µm, from 80 µm to 100 µm, from 85 µm to 100 µm, from 50 µm to 90 µm, or from 95 µm to 100 µm. In embodiments, the glass ceramic articles formed may have a warp on 156 mm×76 mm sheets from 45 µm to 95 µm, such as from 45 µm to 90 µm, from 45 µm to 85 µm, from 45 µm to 80 µm, from 45 µm to 75 pm, from 45 µm to 70 µm, from 45 µm to 65 µm, from 45 µm to 60 µm, from 45 µm to 55 µm, or from 45 µm to 50

In embodiments, by using the ceramming cycles, glass precursor compositions, setter configurations, and stack configurations disclosed and described herein, the glass ceramic articles formed may have stress of less than 30 nm of retardation per mm of sheet thickness, such as less than 28 nm of retardation per mm of sheet thickness, less than 26 nm of retardation per mm of sheet thickness, less than 25 nm of retardation per mm of sheet thickness, less than 24 nm of retardation per mm of sheet thickness, less than 22 nm of retardation per mm of sheet thickness, less than 20 nm of retardation per mm of sheet thickness, less than 18 nm of retardation per mm of sheet thickness, less than 16 nm of retardation per mm of sheet thickness, or less than 15 nm of retardation per mm of sheet thickness. In embodiments, the glass ceramic articles formed may have a stress from 15 nm to 30 nm of retardation per mm of sheet thickness, such as from 18 nm to 30 nm of retardation per mm of sheet thickness, from 20 nm to 30 nm of retardation per mm of sheet thickness, from 22 nm to 30 nm of retardation per mm of sheet thickness, from 24 nm to 30 nm of retardation per mm of sheet thickness, or from 28 nm to 30 nm of retardation per mm of sheet thickness. In embodiments, the glass ceramic articles formed may have a stress from 15 nm to 25 nm of retardation per mm of sheet thickness, from 18 nm to 25 nm of retardation per mm of sheet thickness, from 20 nm to 25 nm of retardation per mm of sheet thickness, or from 22 nm to 25 nm of retardation per mm of sheet thickness.

End Products

Figure 30A:
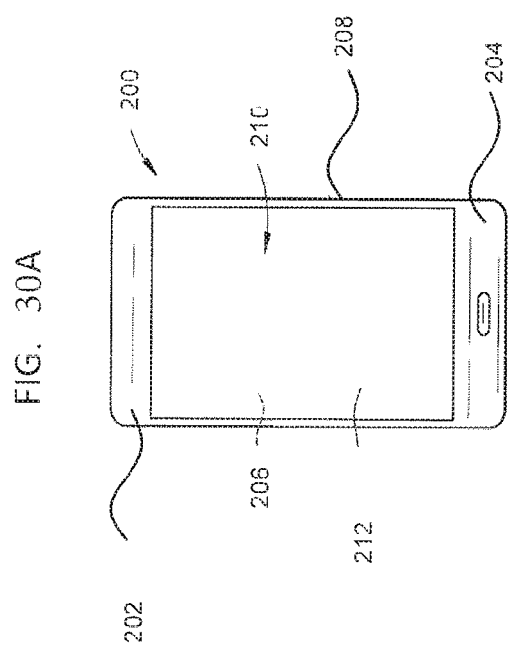
FIG. 30A is a plan view of an exemplary electronic device incorporating any of the glass-ceramic articles according to embodiments disclosed and described herein.
Figure 30B:
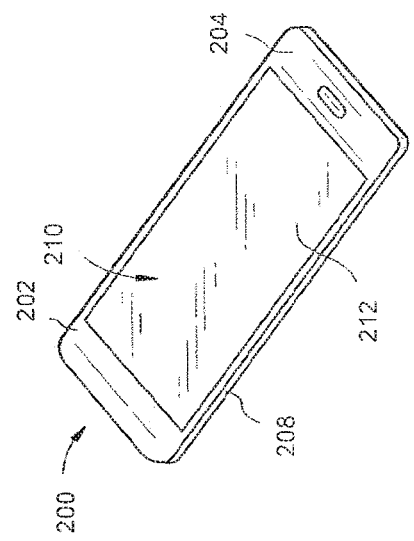
FIG. 30B is a perspective view of the exemplary electronic device according to embodiments disclosed and described herein.

The glass-ceramic articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc. for example for use an interior display cover, a window, or windshield), appliance articles, or any article that requires some transparency, scratch-resistance, abrasion resistance or a combination thereof. An exemplary article incorporating any of the strengthened glass-ceramic articles disclosed herein is shown in FIGS. 30A and 30B. Specifically, FIGS. 30A and 30B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least one of the cover substrate 212 or a portion of housing 202 may include any of the glass-ceramic strengthened articles disclosed herein.

Accordingly, various embodiments described herein may be employed to produce glass ceramic articles having excellent optical quality and reduced warp while not adversely impacting, or even improving, stress in the glass ceramic articles as compared to glass articles cerammed according to conventional techniques. Such glass ceramic articles may be particularly well-suited for use in portable electronic devices due to their strength performance and high transmission values.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming glass ceramic articles comprising:
   heating a stack of glass sheets to a nucleation temperature to create a nucleated crystallizable stack of sheets;
   maintaining the nucleation temperature for a first predetermined period of time;
   heating the nucleated crystallizable stack of glass sheets to a crystallization temperature; and
   maintaining the crystallization temperature for a second predetermined period of time to produce the glass-ceramic articles,
   wherein:
      the stack of glass sheets has a mass index of less than or equal to 35;
      the number of glass sheets in the stack of glass sheets is greater or equal to 10;
      at least three glass sheets in the stack of glass sheets are separated from an adjacent glass sheet by a parting agent layer;
      the glass sheets have a thickness less than or equal to 1.11 mm,
      the stack of glass sheets is configured to be placed on a setter plate during heating, and
      the setter plate is supported by a carrier plate, the carrier plate having an open carrier design.

2. The method for forming glass ceramic articles of claim 1, wherein the stack of glass sheets has a mass index of less than or equal to 25.

3. The method for forming glass ceramic articles of claim 1, wherein the stack of glass sheets has a mass index of less than or equal to 15.

4. The method for forming glass ceramic articles of claim 1, wherein the stack of glass sheets has a mass index of less than or equal to 10.

5. The method for forming glass ceramic articles of claim 1, wherein the number of glass sheets in the stack of glass sheets is less than 31.

6. The method for forming glass ceramic articles of claim 1, the number of glass sheets in the stack of glass sheets is less than 22.

7. The method for forming glass ceramic articles of claim 1, wherein the setter plate is positioned on at least one surface of the stack of glass sheets.

8. The method for forming glass ceramic articles of claim 1, wherein the method comprises:
   heating a plurality of stacks of glass sheets to a nucleation temperature to create a nucleated crystallizable plurality of stacks of glass sheets;
   maintaining the nucleation temperature for the first predetermined period of time;
   heating the nucleated crystallizable plurality of stacks of glass sheets to a crystallization temperature; and
   maintaining the crystallization temperature for the second predetermined period of time to produce the glass-ceramic articles,
   wherein:
      each one of the plurality of stacks of glass sheets has a mass index of less than or equal to 35;
      the number of glass sheets in the stack of glass sheets is greater or equal to 10; and
      the glass sheets have a thickness less than or equal to 1.11 mm.

9. The method of claim 8, wherein each one of the plurality of stacks of glass sheets has a mass index of less than or equal to 25.

10. The method of claim 8, wherein each one of the plurality of stacks of glass sheets has a mass index of less than or equal to 10.

11. The method of claim 8, wherein
    the stack of glass sheets is positioned on the setter plate that is supported by the carrier plate,
    a setter is placed on the stack of glass sheets such that a first surface of the setter is in contact with the stack of glass sheets, and
    a second stack of glass sheets is placed on a second surface of the setter, wherein the second surface of the setter is opposite of the first surface of the setter.

12. The method of claim 1, wherein the nucleation temperature is from 500° C. to 650° C., and the crystallization temperature is from 680° C. to 800° C.

13. The method of claim 1, wherein the first predetermined period of time is greater than 1 minute.

14. The method of claim 1, wherein the stack of glass sheets is positioned between two adjacent setters.

15. The method of claim 1, wherein the stack of glass sheets further comprises one or more interlayer setter plates and the number glass sheets between each interlayer setter plate is from 5 to 10.

16. The method of claim 1, wherein the carrier plate comprises solid metal.

* * * * *